United States Patent
Ageishi et al.

(10) Patent No.: US 8,246,158 B2
(45) Date of Patent: *Aug. 21, 2012

(54) IMAGE RECORDING COMPOSITION, IMAGE RECORDING INK SET AND RECORDING APPARATUS

(75) Inventors: Kentaro Ageishi, Kanagawa (JP); Yoshiro Yamashita, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 12/326,248

(22) Filed: Dec. 2, 2008

(65) Prior Publication Data

US 2009/0318591 A1    Dec. 24, 2009

(30) Foreign Application Priority Data

Jun. 20, 2008  (JP) .................................. 2008-162071

(51) Int. Cl.
*B41J 2/01* (2006.01)
(52) U.S. Cl. ......................... 347/103; 347/102; 347/101
(58) Field of Classification Search .................. 118/620, 118/300, 641; 523/160, 161; 524/88, 500; 347/102, 104, 103, 100, 101
See application file for complete search history.

(56) References Cited

U.S. PATENT DOCUMENTS

| | | | |
|---|---|---|---|
| 5,683,784 A | 11/1997 | Nakao et al. | |
| 6,001,466 A * | 12/1999 | Noguchi et al. | 428/327 |
| 6,136,382 A | 10/2000 | Kamen et al. | |
| 6,257,716 B1 | 7/2001 | Yanagawa et al. | |
| 7,261,408 B2 | 8/2007 | Otter | |
| 7,270,408 B2 | 9/2007 | Odell et al. | |
| 2001/0038409 A1 | 11/2001 | Yanagawa et al. | |
| 2001/0055047 A1 | 12/2001 | Ohsawa et al. | |
| 2001/0055728 A1 | 12/2001 | Shibata | |
| 2003/0068571 A1 | 4/2003 | Uehara et al. | |
| 2003/0165766 A1 | 9/2003 | Zhang et al. | |
| 2005/0031348 A1* | 2/2005 | Choi et al. | 398/59 |
| 2005/0031384 A1* | 2/2005 | Sohmiya et al. | 399/309 |
| 2005/0110856 A1 | 5/2005 | Mouri et al. | |
| 2005/0259138 A1* | 11/2005 | Doi | 347/100 |
| 2006/0127651 A1 | 6/2006 | Murata et al. | |
| 2006/0158492 A1 | 7/2006 | Odell et al. | |
| 2006/0164487 A1* | 7/2006 | Kadomatsu et al. | 347/102 |
| 2006/0286315 A1* | 12/2006 | Hashimoto et al. | 428/32.34 |
| 2007/0034152 A1 | 2/2007 | Nakagawa et al. | |

(Continued)

FOREIGN PATENT DOCUMENTS

CN             1911532         2/2007

(Continued)

OTHER PUBLICATIONS

USPTO Office Action, U.S. Appl. No. 12/361,039; Apr. 28, 2011.

(Continued)

*Primary Examiner* — Manish S Shah
(74) *Attorney, Agent, or Firm* — Fildes & Outland, P.C.

(57) ABSTRACT

An image recording composition including water-absorbing resin particles and a curable material that is cured upon application of an external stimulus, a volume average particle diameter of the water-absorbing resin particles being from about 0.5 µm to about 5.0 µm, and a content of the water-absorbing resin particles in the image recording composition being from about 5% by weight to about 50% by weight.

12 Claims, 5 Drawing Sheets

U.S. PATENT DOCUMENTS

| | | |
|---|---|---|
| 2007/0120930 A1 | 5/2007 | Domoto et al. |
| 2007/0176995 A1* | 8/2007 | Kadomatsu et al. .......... 347/103 |
| 2007/0296790 A1 | 12/2007 | Nakazawa et al. |
| 2008/0045619 A1 | 2/2008 | Jackson et al. |
| 2008/0062241 A1 | 3/2008 | Yamashita et al. |
| 2009/0231406 A1 | 9/2009 | Yamashita et al. |
| 2009/0237479 A1 | 9/2009 | Yamashita et al. |
| 2009/0318591 A1 | 12/2009 | Ageishi et al. |
| 2009/0318613 A1 | 12/2009 | Ageishi et al. |

FOREIGN PATENT DOCUMENTS

| | | |
|---|---|---|
| CN | 101143513 | 3/2008 |
| JP | 5-229112 | 9/1993 |
| JP | 7-169100 | 7/1995 |
| JP | 08-090900 | 4/1996 |
| JP | 08-311784 | 11/1996 |
| JP | 9-263038 | 10/1997 |
| JP | 10-255331 | 9/1998 |
| JP | 11-188858 | 7/1999 |
| JP | 11-235866 | 8/1999 |
| JP | 11-259913 | 9/1999 |
| JP | 2000-052640 | 2/2000 |
| JP | 2000-94654 | 4/2000 |
| JP | 2000-198185 | 7/2000 |
| JP | 2000-343808 | 12/2000 |
| JP | 2001-10114 | 1/2001 |
| JP | 2001-212956 | 8/2001 |
| JP | 2001-315426 | 11/2001 |
| JP | 2002-321443 | 11/2002 |
| JP | 2002-370347 | 12/2002 |
| JP | 2003-57967 | 2/2003 |
| JP | 2003-080746 | 3/2003 |
| JP | 2003-080837 | 3/2003 |
| JP | 2003-246135 | 9/2003 |
| JP | 2004-009523 | 1/2004 |
| JP | 2004-148530 | 5/2004 |
| JP | 2005-170036 | 6/2005 |
| JP | 2006-193744 | 7/2006 |
| JP | 2007-015241 | 1/2007 |
| JP | 2007-58952 | 3/2007 |
| JP | 2007-152945 | 6/2007 |
| JP | 2007-230232 | 9/2007 |
| JP | 2008-68429 | 3/2008 |
| JP | 2008-100501 | 5/2008 |

OTHER PUBLICATIONS

USPTO Office Action, U.S. Appl. No. 12/326,287; May 18, 2011.
USPTO Office Action, U.S. Appl. No. 12/325,595; Jan. 24, 2011.
USPTO Office Action, U.S. Appl. No. 12/325,595; Feb. 28, 2011.
USPTO Office Action, U.S. Appl. No. 12/325,595; Aug. 9, 2011.
USPTO Office Action, U.S. Appl. No. 12/361,039; Sep. 29, 2011.
USPTO Office Action, U.S. Appl. No. 12/326,287; Oct. 27, 2011.

* cited by examiner

IMAGE RECORDING COMPOSITION, IMAGE RECORDING INK SET AND RECORDING APPARATUS

CROSS-REFERENCE TO RELATED APPLICATION

This application is based on and claims priority under 35 USC 119 from Japanese Patent Application No. 2008-162071 filed Jun. 20, 2008.

BACKGROUND

1. Technical Field

The present invention relates to an image recording composition, an image recording ink set and a recording apparatus.

2. Related Art

An inkjet recording system constitutes one method of recording images, data, and the like with the use of ink. The principle of the inkjet recording system is such that an image is formed on a medium made of paper, cloth, or a film, by ejecting an ink in the form of a liquid or a melted solid through a nozzle, a slit, a porous film, or the like. Various methods of ejecting ink have been proposed, including a so-called charge-control system in which ink is ejected by means of an electrostatic attractive force; a so-called drop-on-demand system (pressure pulse system) in which ink is ejected by means of oscillating pressure in a piezoelectric element; a so-called thermal inkjet system in which ink is ejected by means of pressure generated by forming and growing air bubbles using a high temperature; and the like. By employing these systems, recorded materials portraying an image or data with extremely high fineness can be obtained.

In order to perform recording of an image or data with high fineness on various recording media including both permeable media and impermeable media, a method of recording an image onto an intermediate transfer member and then transferring the image onto a recording medium has been applied in recording systems using ink, including the aforementioned inkjet recording systems.

SUMMARY

According to an aspect of the invention, there is provided an image recording composition comprising: water-absorbing resin particles and a curable material that is cured upon application of an external stimulus, a volume average particle diameter of the water-absorbing resin particles being from about 0.5 µm to about 5.0 µm, and a content of the water-absorbing resin particles in the image recording composition being from about 5% by weight to about 50% by weight.

BRIEF DESCRIPTION OF THE DRAWINGS

Exemplary embodiments of the present invention will be described in detail based on the following figures, wherein.

DETAILED DESCRIPTION

Figure 1A:
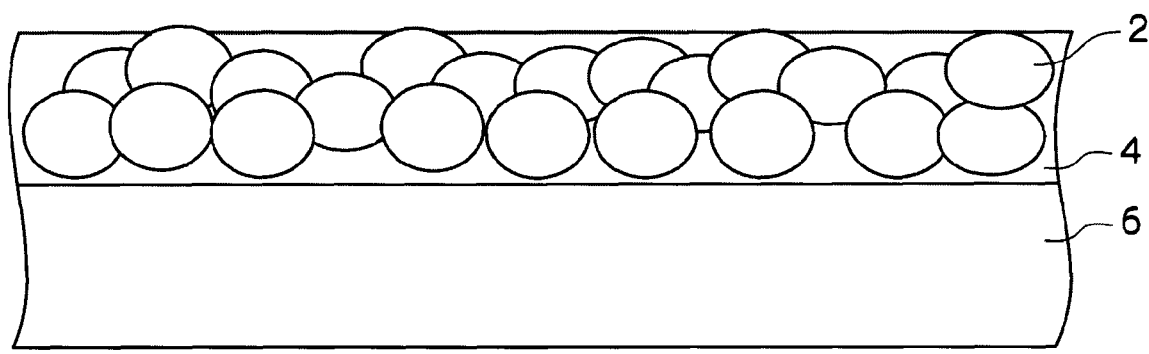
FIG. 1A is a schematic sectional view showing a state of water-absorbing particles in a curable layer before ejecting an ink.

Hereinafter, exemplary embodiments of the invention will be described in details. The image recording composition used in the exemplary embodiments of the invention includes a curable material that is cured upon application of an external stimulus and water-absorbing resin particles. The volume average particle diameter of the water-absorbing resin particles is from 0.5 µm or about 0.5 µm to 50 µm or about 50 µm, and the content of the water-absorbing resin particles in the image recording composition is from 5% by weight or about 5% by weight to 50% by weight or about 50% by weight.

The image recording composition is supplied to an intermediate transfer member or a recording medium to form a curable layer thereon, and an image is formed by ejecting an aqueous ink including an aqueous medium onto the curable layer.

In conventional inkjet recording apparatuses, there are problems such as curling, yellowing or deterioration of a recording medium, lowering of the recording speed, and the like, due to the drying time or heat, caused by moisture remaining in a recording medium without volatilizing. Moreover, degradation in properties of conveying a recording medium or positional stability of the recording medium is caused by lowering of electrostatic characteristics for absorbing the recording medium. Further, in the image recording process utilizing a powdery material, such as an intermediate transfer member used in an electrophotographic method or the like, there are problems such as a difficulty in improving resolution due to degradation of an image during fixation on a recording medium, restriction on the powdery particle component for use to a size of 5 µm or more, in compliance with environmental concerns such as dust control, and the like. Further, degradation in resolution may by caused by a difference in image retention due to permeation, in adhesion of ink to voids among the particles. Moreover, degradation in retainability of water-absorbing particles on an intermediate transfer member may be caused by decrease in an ability of an aqueous ink itself to electrostatically adhere the powdery material. In a thermal fixing system, similarly to the electrophotographic method, there is an increase in thermal energy in order to perform high-speed fixation. Accordingly, there are problems due to thermal history of an intermediate transfer member it self, such as degradation in color registration, contamination of ink, degradation in cleaning properties due to a remnant after fixation, degradation in an image due to re-permeation of ink within the voids in a recording medium, re-volatilization of ink that has permeated the recording medium due to thermal fixation, presence of air bobbles, or the like, which may result in formation of defects in the image. Consequently, there is a difficulty in performing high-speed and high-quality printing in a system in which a liquid is adhered to the surface of an intermediate transfer member and ink is adhered to the liquid, then the ink is transferred to a recording medium together with the liquid.

While the reason why diffusion of an aqueous ink is suppressed and a transferred image with a high definition is formed when the image recording composition specified as above is used is not clear, it may be considered to be as follows.

When a curable layer is formed from the above-specified image recording composition, water-absorbing resin particles 2 are dispersed in a curable layer 4 and a small part of the water-absorbing resin particles 2 is exposed on the surface of the curable layer 4 due to a difference in densities of the water-absorbing resin particles 2 and the curable layer 4, as shown in FIG. 1A.

Figure 1B:
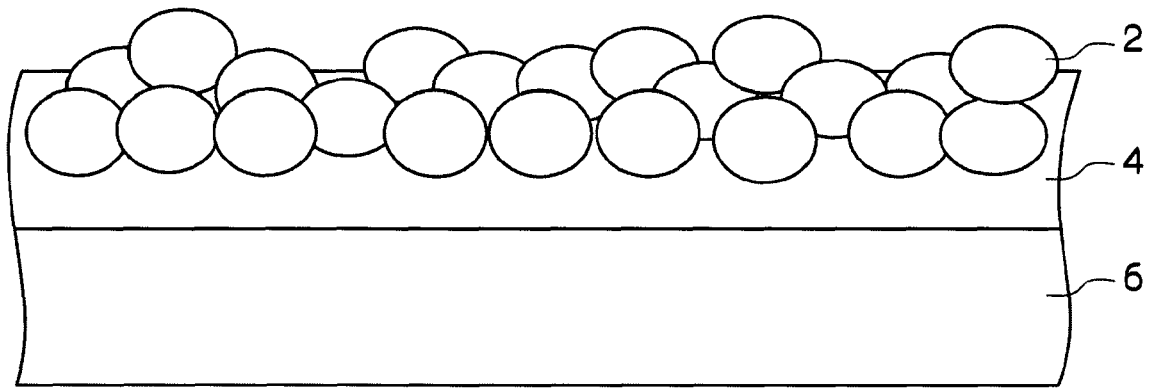
FIG. 1B is a schematic sectional view showing a state of water-absorbing particles in a curable layer after ejecting an ink.

When ink is ejected onto the curable layer 4, an aqueous medium in the ink permeates the exposed portion of the water-absorbing resin particles 2, which exposes more part of the water-absorbing resin particles 2 containing the aqueous medium on the surface of the curable layer 4, due to the widened difference in densities of water-absorbing resin particles 2 and the curable layer 4, as shown in FIG. 1B.

The aqueous medium diffuses in and permeates the part of the water-absorbing resin particles 2 that is not exposed on the surface of the curable layer 4, through the part of the water-absorbing resin particles 2 containing the aqueous medium, thereby exposing the part on the surface of the curable layer 4 or moving toward the surface of the curable layer 4, by a similar mechanism due to the difference in densities.

By the water-absorbing resin particles 2 exposed on the surface of the curable layer 4 after the ejection of the ink, permeation of the ink composition into the water-absorbing resin particles 2 can be facilitated and diffusion of the aqueous ink in a hydrophobic medium can be suppressed, thereby forming an image with high definition.

The influences of heating and contraction that occur upon curing of the curable layer 4 is thought to promote volatilization of moisture in ink and alleviate the influences of swelling of the particles, thereby enabling image formation in an even stable manner in a high-speed transferring, owing to a synergetic effect of the above two effects.

In an exemplary embodiment in which ink is ejected onto the above-described curable layer formed on an intermediate transfer member and then transferred to a recording medium to form an image, favorable transfer properties (releasability of the curable layer from the intermediate transfer member) can be obtained and an image having high glossiness can be formed, since surface properties of the intermediate transfer member can be maintained on the recording medium. While the reason for the above is not clear, it is thought to be as follows.

The curable layer is transferred to the recording medium in such a state that the water-absorbing resin particles are positioned in the surface side of the curable resin (the side on which ink is ejected to form an image), while the water-absorbing resin particles are not present or present in a small amount on the intermediate-transfer-member side of the curable layer (the side on which printing is not performed). Therefore, favorable transfer properties (releasability) from the intermediate transfer member can be achieved. On the other hand, the curable layer that has been transferred to the recording medium contains water-absorbing resin particles in the recording-medium side of the curable layer, not in the surface side (the side opposite to the recording medium). Accordingly, the surface properties of the intermediate transfer medium can be directly transferred to the recording medium, thereby forming an image having a smooth surface with high glossiness.

Yet another effect is thought to be that an interface being adhesive at the time of application turns to a film having releasability at the time of curing. Therefore, the adhesive coating film on the intermediate transfer member may be easily transferred to a recording medium, while easily released from the surface (non-printed surface in contact with the intermediate transfer member) at the time of curing, thereby enabling transferring with high efficiency.

Hereinafter, exemplary embodiments of the invention will be explained with reference to the drawings. The same denotations are given to the members having the same function in all drawings, and overlapping explanations may be omitted.

FIRST EXEMPLARY EMBODIMENT

Figure 2:
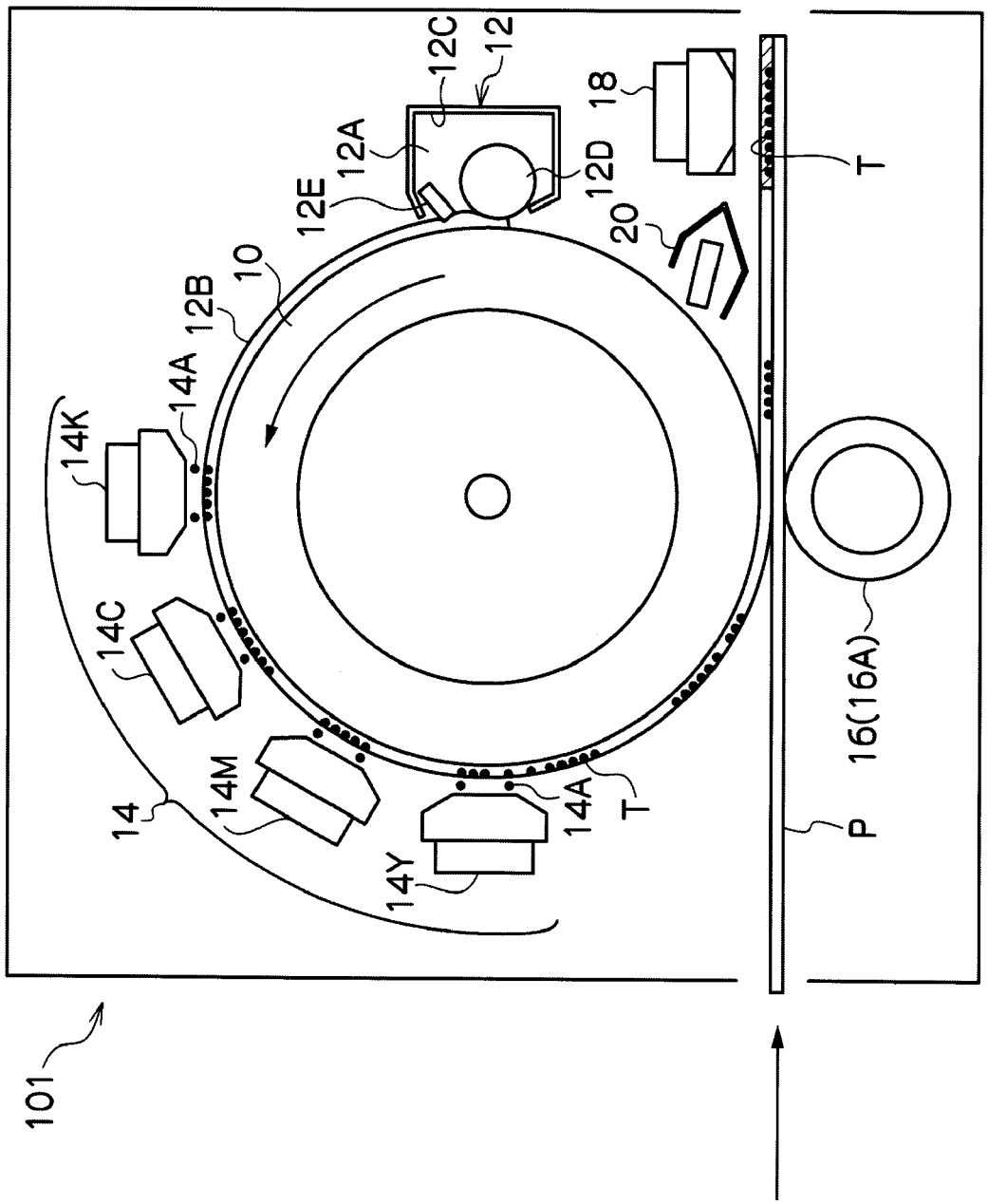
FIG. 2 is a configurational drawing showing a recording apparatus according to a first exemplary embodiment of the invention.

FIG. 2 is a configurational drawing showing a recording apparatus according to a first exemplary embodiment of the invention.

As shown in FIG. 2, a recording apparatus 101 according to a first exemplary embodiment includes, for example, an intermediate transfer drum 10; a supply unit 12 that forms, onto the intermediate transfer drum 10, a curable layer 12B by supplying an image recording composition 12A containing at least a curable material that is cured by an external stimulus (energy such as heat, UV rays and electron beams) and water-absorbing resin particles; an inkjet recording head 14 that forms an image T by ejecting ink droplets 14A including an aqueous medium onto the curable layer 12B; a transfer unit 16 that transfers the curable layer 12B, on which the image T is formed, onto a recording medium P by positioning the recording medium P on the intermediate transfer drum 10 and applying a pressure thereto; and a stimulus application unit 18 that applies a stimulus by which the curable layer 12B that has been transferred onto the recording medium P is cured.

Further, in the downstream of the transfer unit 16 in a direction in which the intermediate transfer drum 10 rotates may be positioned a cleaning unit 20 that removes a residue from the curable layer 12B remaining on the surface of the intermediate transfer drum 10, and other foreign matters attached to the intermediate transfer drum 10 such as paper powder from the recording medium P, and the like.

The intermediate transfer drum 10 may have, for example, a cylindrical substrate and a surface layer covering the surface of the cylindrical substrate. The intermediate transfer drum 10 may have a width (the length in an axial direction) that is equal to or wider than the width of the recording medium P.

The materials for the cylindrical substrate include, for example, aluminum, stainless steel (SUS), copper, and the like.

The materials for the surface layer include, for example, various kinds of resins (such as polyimide, polyamideimide, polyester, polyurethane, polyamide, polyether sulfone, and fluorine-based resin), various kinds of rubbers (such as nitrile rubber, ethylene propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, and fluororubber), and the like. The surface layer may have a single layer structure or a laminated structure.

The supply unit 12 includes, for example, a supply roller 12D that supplies the image recording composition 12A to the intermediate transfer drum 10, and a blade 12E that regulates the thickness of the curable layer 12B formed from the supplied the image recording composition 12A, in a housing 12C in which the image recording composition 12A is stored.

The supply roller 12D in the supply unit 12 may be in contact with the intermediate transfer drum 10 in a continuous manner, or may be positioned apart from the intermediate transfer drum 10. Further, the supply unit 12 may supply the image recording composition 12A to the housing 12C from an independent supply system (not shown) so that the image recording composition 12A can be continuously supplied.

Here, the "curable material that cures upon application of an external stimulus (energy)" contained in the image recording composition 12A refers to a material that is cured by an external stimulus to become a "curable resin". Specific examples of such materials include curable monomers, curable macromers, curable oligomers, and curable prepolymers. Details of these materials will be described later.

The "water-absorbing resin particles" refers to particles formed from a material that absorbs an aqueous medium. Details of these materials will be described later.

The structure of supply unit 12 is not limited to the above configuration, and may be those utilizing known supplying methods including application methods such as bar coater coating, spray coating, inkjet coating, air-knife coating, blade coating, and roll coating.

The inkjet recording head 14 includes, for example, recording heads for each color including a recording head 14K for ejecting an black ink, a recording head 14C for ejecting a cyan ink, a recording head 14M for ejecting a magenta ink, and a recording head 14Y for ejecting a yellow ink, positioned in this order from the upstream side in a direction in which the intermediate transfer drum 10 rotates. Of course, the structure of the recording head 14 is not limited to the above configuration, and may not include all of the recording heads 14K, 14C, 14M and 14Y.

Each recording head 14 is preferably, for example, a line-type inkjet recording head having a width equal to or wider than the width of a recording medium P, but a conventional scan-type inkjet recording head may also be used. The method of ejecting ink of each recording head 14 may be any method in which ink can be ejected, such as a piezo-electric-element-driving method and a heating-element-driving method.

Each recording head 14 may be arranged, for example, in series in the order of the recording head 14K, the recording head 14C, the recording head 14M and the recording head 14Y from the upstream side in a direction of rotation of the intermediate transfer drum 10.

Each recording head 14 may be arranged in such a manner that the distance between the surface of the intermediate transfer drum 10 and the nozzle face of the head is, for example, from about 0.3 mm to about 0.7 mm. Further, each recording head 14 is arranged, for example, such that the longitudinal direction thereof intersects with the rotation direction of the intermediate transfer drum 10 (desirably in a perpendicular manner).

The transfer device 16 includes a pressure roll 16A which is arranged so that the pressure roll 16A is pressed against the intermediate transfer drum 10. The pressure roll 16A may be formed from, for example, materials similar to those used for the intermediate transfer drum 10.

A stimulus application unit 18 is selected in accordance with the kind of the curable material contained in the image recording composition 12A. Specifically, for example, when the curable material is a material that is curable upon irradiation with ultraviolet rays, an ultraviolet-ray irradiation unit that irradiates the image recording composition 12A (or the curable layer 12B formed from the image recording composition 12A) with ultraviolet rays is used as the stimulus application unit 18. When the curable material is a material that is curable upon irradiation with electron beams, an electron-beam irradiation unit that irradiates the image recording composition 12A (or the curable layer 12B formed from the image recording composition) with electron beams is used as the stimulus application unit 18. Furthermore, when the material is a material that is curable upon application of heat, a heat apply unit that applies heat to the image recording composition 12A (or the curable layer 12B formed from the image recording composition 12A) is used as the stimulus application unit 18.

The ultraviolet-ray irradiation unit may be, for example, a metal halide lamp, a high-pressure mercury lamp, an ultra high-pressure mercury lamp, a deep ultraviolet-ray lamp, a lamp that excites a mercury lamp externally with a microwave ultraviolet laser without using an electrode, a xenon lamp, a UV-LED, and the like.

The conditions for the irradiation with ultraviolet rays are not specifically limited as long as the image recording composition 12A containing a material that is curable upon irradiation with ultraviolet rays (or the curable layer 12B formed from the image recording composition 12A) is fully cured, and may be selected depending on the type of the material that is curable upon irradiation with ultraviolet rays or the thickness of the curable layer 12B formed from the image recording composition 12A, and the like. For example, the irradiation may be conducted with a high-pressure mercury lamp at a power density of 120 W/cm for from 2 s to several ten ms.

The electron-beam irradiation unit may be, for example, a scan-type unit or a curtain-type unit. The curtain-type electron-beam irradiation unit is a device in which thermoelectrons generated at a filament is drawn out by a grid in a vacuum chamber, which are accelerated to form an electron current by a high voltage (for example, 70 kV to 300 kV), and the electron current passes through a window foil to be discharged into the atmosphere. The wavelength of the electron beams is generally shorter than 1 nm, and the energy of the electron beams can be up to several MeVs, but the electron beams having a wavelength in an order of pm and energy of several ten keV to several hundred keV are normally used.

The conditions for irradiation with the electron beams are not specifically limited as long as the image recording composition 12A (or the curable layer 12B formed from the image recording composition 12A) is fully cured, and may be selected depending on the type of the electron beam-curable material, the thickness of the curable layer 12B, and the like. For example, the irradiation may be conducted with an electron beam quantity of from 5 to 100 kGy levels.

The heat apply unit may be, for example, a halogen lamp, a ceramic heater, a Nichrome-wire heater, a microwave heater, an infrared-ray lamp, and the like. A heating device employing an electromagnetic induction method is also applicable.

The conditions for applying heat are not specifically limited as long as the image recording composition 12A containing a material that can be cured by heat (or the curable layer 12B formed from the image recording composition 12A) is fully cured, and may be selected depending on the type of the material that can be cured by heat, the thickness of the curable layer 12B, and the like. For example, the application of heat may be conducted at a temperature of 200° C. for 5 minutes, in the atmosphere.

The above-mentioned state that is "fully cured" refers to a state in which transfer does not occur even when a sheet of paper having permeability (plain paper) is put on the curable layer 12B, which has been cured by the stimulus application unit 18, and a load of 200 g is applied thereon.

The recording medium P may be either a permeable medium (for example, plain paper, coat paper and the like) or a non-permeable medium (for example, art paper, resin film, and the like). However, the recording medium is not restricted thereto and may be other industrial products, such as a semi-conductor substrate.

In the following, an image recording process using the recording apparatus 101 according to the present exemplary embodiment will be explained.

In the recording apparatus 101 according to the present exemplary embodiment, the intermediate transfer drum 10 is driven to rotate, and the image recording composition 12A is supplied onto the surface of the intermediate transfer drum 10 from the supply unit 12 to form a curable layer 12B.

The thickness of the curable layer 12B is not specifically restricted, but may be from 0.1 μm to 100 μm, preferably from 0.5 μm to 50 μm, and more preferably from 0.5 μm to 20 μm, from the viewpoint of exposing the water-absorbing resin particles in a favorable manner on the surface of a mixed layer in which the curable layer and the resin are mixed with each other, after ink has been ejected on the mixed layer.

The thickness of the curable layer is determined depending on the viscosity of the resin and the size and the distribution thereof of the particles, since the water-absorbing resin particles is partially phase-dissolved or suspended in a resin medium having a certain degree of compatibility. The thickness in a printed portion increases compared to the application thickness due to swelling of the layer absorbing a liquid on the intermediate transfer member, but almost the same thickness as the application thickness can be maintained by leveling of the layer prior to the transferring, pressing of the layer during the transferring, contraction of the resin component due to curing, permeation of residual ink remaining on the printed portion into the recording medium, or the like. Further, stable image conditions are thought to be maintained due to permeation of the particles in the recording medium or the resin, upon transferring.

Further, for example, when the curable layer 12B has a thickness through which ink droplets 14A do not reach the bottom of the layer 12B, the portion in which the ink droplets 14A exist in the curable layer 12B will not be exposed after the transferring of the layer 12B onto the recording medium P, and thus the region in which the ink droplets 14A are absent may serve as an overcoat layer after being cured.

Next, the ink droplets 14A ejected from the inkjet recording head 14 are applied to the curable layer 12B that has been supplied onto the intermediate transfer drum 10. The inkjet recording head 14 applies the ink droplets 14A to a predetermined position in the curable layer 12B in accordance with the image information.

In this case, the ejection of the ink droplets 14A from the inkjet recording head 14 is performed on the intermediate transfer drum 10 having a rigid body. Therefore, the ejection of the ink droplets 14A is performed on the curable layer 12B in such a state that the surface of the drum is not flexed.

Next, a recording medium P is nipped between the intermediate transfer drum 10 and the transfer unit 16, and a pressure is applied to the curable layer 12B to transfer the curable layer 12B on which an image is formed by the ink droplets 14A onto the recording medium P.

Next, the image T formed by the ink droplets 14A is fixed onto the recording medium P by means of a curable resin, by curing the curable layer 12B by applying a stimulus by the stimulus application unit 18. In this way, the curable resin layer (image layer) having the image T formed from the ink droplets 14A is formed on the recording medium P.

Thereafter, residues of the curable layer 12B and foreign matters remaining on the surface of the intermediate transfer drum 10 from which the curable layer 12B has been transferred to the recording medium P are removed by a cleaning unit 20. The image recording process is repeated by supplying the image recording composition 12A onto the intermediate transfer drum 10 from the supply unit 12 and forming the curable layer 12B.

As described above, image recording is performed in the recording apparatus 101 according to the present exemplary embodiment.

The surface roughness (Rz) of the curable layer (image layer) is preferably 10 μm or less, more preferably 5 μm or less. The maximum roughness (Rmax) is preferably 20 μm or less, more preferably 10 μm or less. The Rz may be measured in accordance with JIS-B0601 (1982) and the Rmax may be measured in accordance with JIS-B0601 (1994), respectively, the disclosure of which is incorporated herein by reference.

SECOND EXEMPLARY EMBODIMENT

Figure 3:
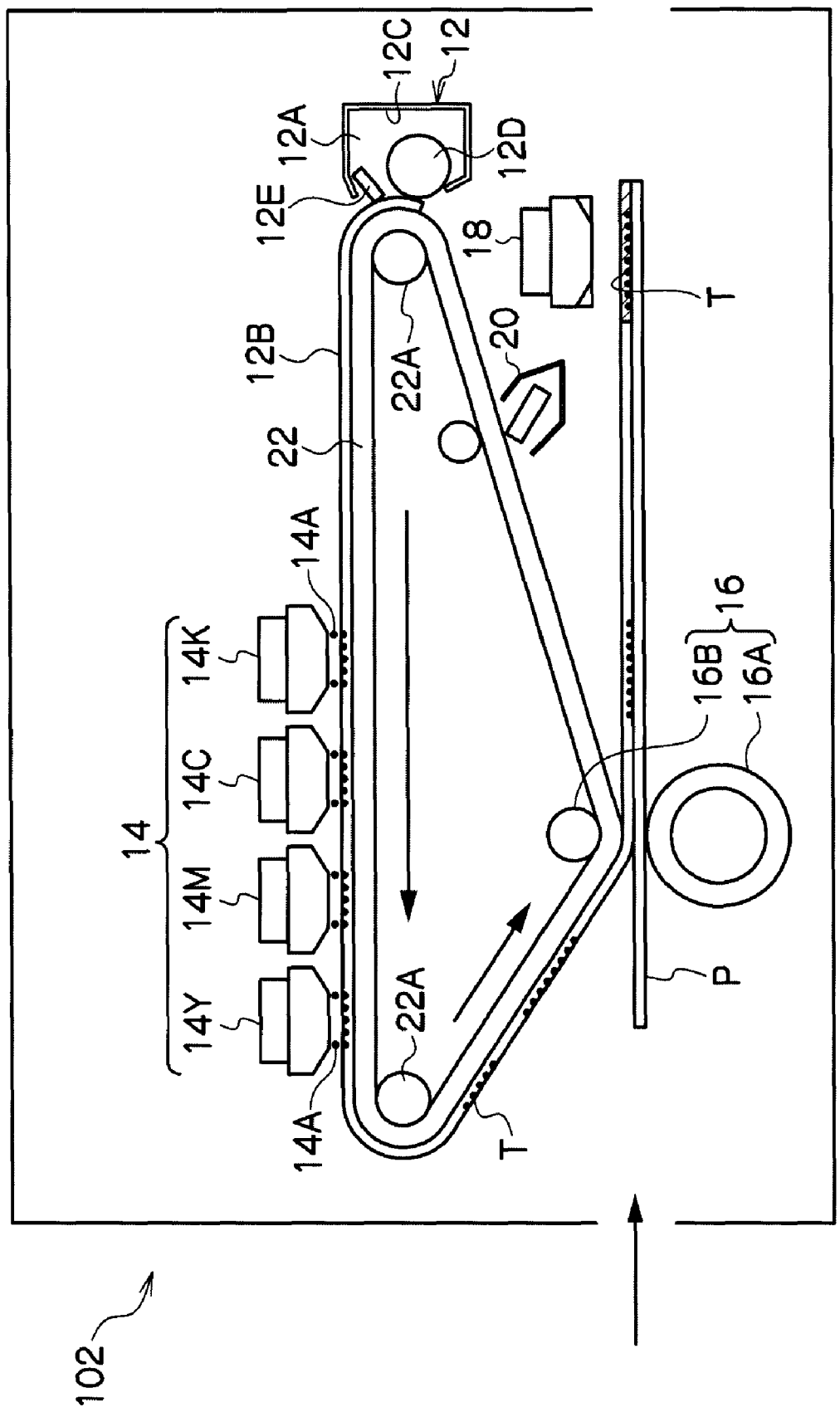
FIG. 3 is a configurational drawing showing a recording apparatus according to a second exemplary embodiment of the invention.

FIG. 3 is a configurational drawing showing a recording apparatus according to a second exemplary embodiment of the invention.

As shown in FIG. 3, the recording apparatus 102 according to the second exemplary embodiment has an intermediate transfer belt 22 in place of the intermediate transfer drum 10 in the first exemplary embodiment.

The intermediate transfer belt 22 is, for example, rotatably supported by two support rollers 22A and a pressure roller 16B (transfer unit 16) while a tension is applied from the inner side of the belt.

The intermediate transfer belt 22 has a width (the length in an axial direction) equal to or wider than the width of the recording medium P. The intermediate transfer belt 22 may be formed from various kinds of resins (such as polyimide, polyamideimide, polyester, polyurethane, polyamide, polyether sulfone, and fluorine-based resins), various kinds of rubbers (such as nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber and fluororubber), and the like. The intermediate transfer belt 22 may have a single-layer structure or a laminated structure. The intermediate transfer belt 22 may have a surface layer formed from a releasable material such as a fluorine-based resin or silicone rubber.

Each recording head 14 is positioned in a region in which the intermediate transfer belt 22 is not flexed, with a distance between the nozzle face of the head and the surface of the intermediate transfer belt 22 of from about 0.7 mm to about 1.5 mm, for example.

The transfer unit 16 includes, for example, a pair of pressure rollers 16A and 16B that are positioned opposite to one another via the intermediate transfer belt 22.

In the recording apparatus 102 according to the present exemplary embodiment, ink droplets 14A are ejected from the inkjet recording head 14 and applied onto the curable layer 12B that has been formed on the intermediate transfer belt 22.

The ejection of the ink droplets 14A from the inkjet recording head 14 is performed in a region in which the intermediate transfer belt 22 is not flexed. Therefore, the ink droplets 14A are ejected onto the curable layer 12B in such a state that the surface of the belt is not flexed.

Since matters other than the above are the same as those of the first exemplary embodiment, explanations thereof will be omitted.

THIRD EXEMPLARY EMBODIMENT

Figure 4:
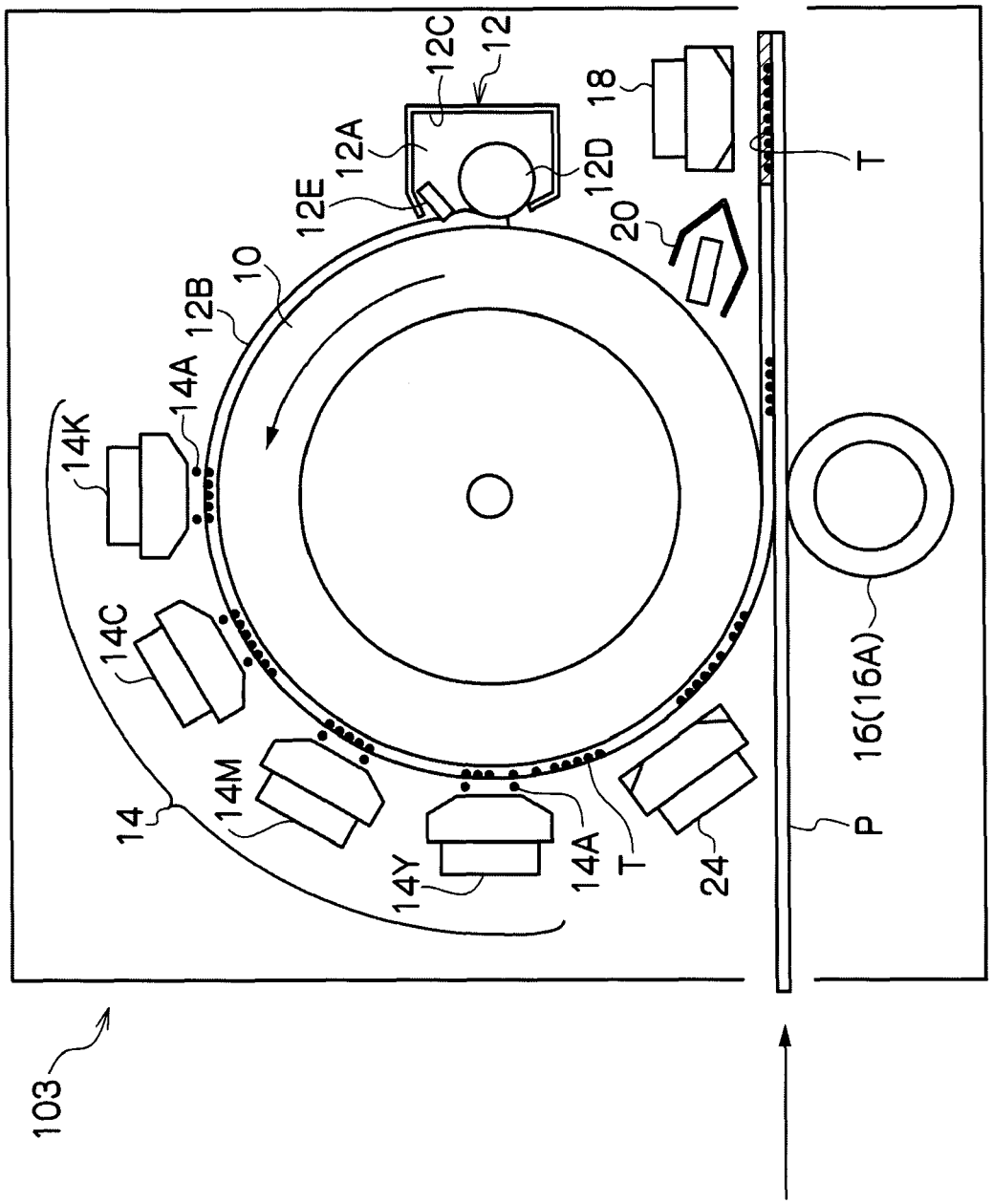
FIG. 4 is a configurational drawing showing a recording apparatus according to a third exemplary embodiment of the invention; and, FIG. 5 is a configurational drawing showing a recording apparatus according to a fourth exemplary embodiment of the invention.

FIG. 4 is a configurational drawing showing a recording apparatus according to a third exemplary embodiment of the invention.

As shown in FIG. 4, a recording apparatus 103 according to the third exemplary embodiment includes a second stimulus application unit 24, which partially cures the curable layer 12B on which an image is formed from ink droplets 14A before the curable layer 12B is transferred onto a recording medium P.

The second stimulus application unit 24 is arranged, for example, downstream of the inkjet recording head 14 but upstream of the transfer device 16, in a rotation direction of the intermediate transfer belt 22.

The second stimulus application unit 24 may be selected depending on the type of the curable material included in the image recording composition 12A, in a similar manner to the stimulus application unit 18. Specifically, when the curable material is a material that is curable by ultraviolet rays, for example, an ultraviolet-ray irradiation unit that irradiates the image recording composition 12A (or the curable layer 12B formed from the image recording composition 12A) with ultraviolet rays is used as the second stimulus application unit 24. When the curable material is a material that is curable by electron beams, an electron-beam irradiation unit that irradiates the image recording composition 12A (or the curable layer 12B formed from the image recording composition 12A) is used as the second stimulus application device 24. Further, when the curable material is a material that is curable by heat, a heat apply unit that applies heat to the image recording composition 12A (or the curable layer 12B formed from the image recording composition 12A) is used as the second stimulus application unit 24.

The conditions of applying ultraviolet rays, electron beams, or heat by the second stimulus application unit 24 are not specifically restricted, and may be selected depending on the type of the curable material, the thickness of the curable layer and the like, as long as the curable layer 12B on which ink droplets 14A are applied by the inkjet recording head 14 is partially cured when transferred from the intermediate transfer drum 10 to a recording medium P by the transfer unit 16.

In this exemplary embodiment, the second stimulus application unit 24 is arranged downstream of the inkjet recording head 14 and upstream of the transfer device 16, but the second stimulus application unit 24 may be arranged upstream of the inkjet recording head 14. When the second stimulus application unit 24 is arranged upstream of the inkjet recording head 14, ink droplets 14A are ejected from the inkjet recording head 14 to the curable layer 12B that has been partially cured to have an increased viscosity. Accordingly, diffusion of the ink droplets 14A in the curable layer 12B is further suppressed, and an image with a higher definition can be formed.

Here, the state of being "partially cured" refers to a state in which the curable material is not "fully cured", but is cured to some extent, as compared with the curable material in a fully liquid state at the time of being supplied onto the intermediate transfer member. Whether or not the curable material is in a state of being "partially cured" can be determined by the following manner. Namely, when transfer of the curable layer 12B to a sheet of paper having permeability (such as plain paper) put on the curable layer 12B does not occur when no load is applied, but occurs with a load of 200 g, it can be determined that the curable layer 12B is partially cured.

In the recording apparatus 103 according to the present exemplary embodiment as described above, the curable layer 12B is partially cured by the second stimulus application unit 24 after the application of the ink droplets 14A ejected from the inkjet recording head 14 onto the curable layer 12B that has been supplied onto the intermediate transfer drum 10, and then the curable layer 12B is transferred onto the recording medium P by the transfer device 16. At the time of the transferring, the curable layer 12B is in a state of being partially cured, namely, having a certain degree of rigidity, and is transferred onto the recording medium P.

Since matters other than the above are the same as those of the first exemplary embodiment, explanations thereof will be omitted.

FOURTH EXEMPLARY EMBODIMENT

Figure 5:
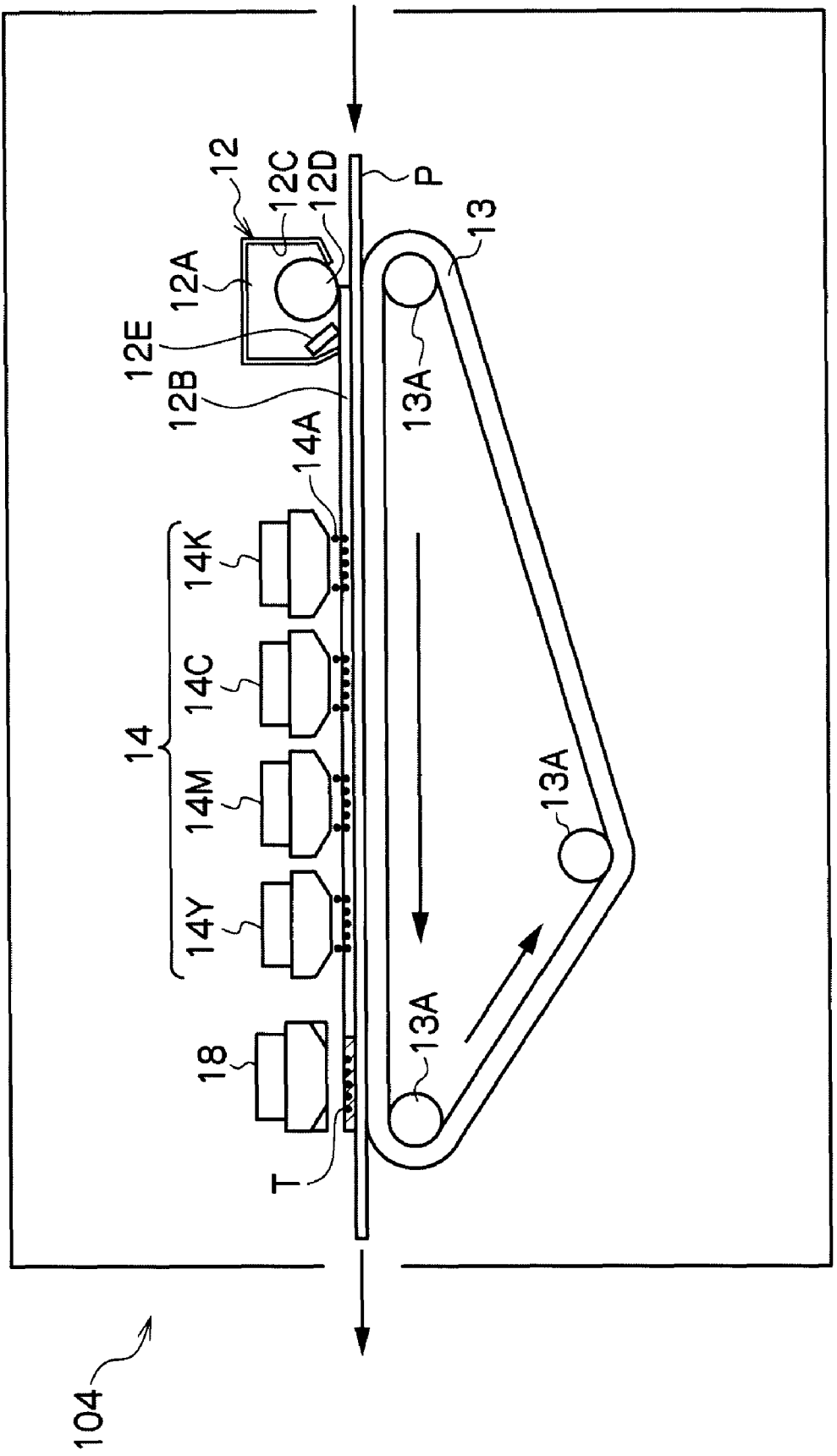

FIG. 5 is a configurational drawing showing a recording apparatus according to a fourth exemplary embodiment of the invention.

As shown in FIG. 5, the recording apparatus 104 according to the fourth exemplary embodiment has a structure in which an image is directly formed on a recording medium P (direct recording system).

The recording apparatus 104 includes, for example, a supply unit 12 that supplies an image recording composition 12A, containing a curable material that is curable upon application of an external stimulus (energy) and water-absorbing resin particles, onto a recording medium P to form a curable layer 12B from the image recording composition 12A; an inkjet recording head 14 that forms an image T by ejecting ink droplets 14A onto the curable layer 12B; and a stimulus application unit 18 that applies a stimulus to cure the curable layer 12B.

Further, the recording apparatus 104 includes a conveyor belt 13 that conveys the recording medium P. The conveyor belt 13 may be, for example, an endless belt similar to the intermediate transfer belt 22 in the second exemplary embodiment. For example, the conveyor belt 13 is rotatably supported by three support rollers 13A while applying a tension from the inner side of the belt. The conveyor belt 13 conveys the recording medium P supplied from a storage container (not shown) and the like, in a direction shown by an arrow by rotating.

In the recording apparatus 104, a curable layer 12B is formed from an image recording composition 12A supplied from a supply unit 12 onto the surface of a recording medium P being conveyed by the conveyor belt 13. Subsequently, ink droplets 14A are ejected from an inkjet recording head 14 in accordance with the image information, and an image T is formed by the ink droplets 14A supplied onto the curable layer 12B formed on the recording medium P. Finally, the curable layer 12B is cured by the stimulus application unit 18, and the curable resin layer (image layer) including the image T formed from the ink droplets 14A is formed on the recording medium P.

Since matters other than the above are the same as those of the first exemplary embodiment, explanations thereof will be omitted.

In the recording apparatuses according to the exemplary embodiments described above, the image recording composition 12A is applied to the intermediate transfer drum 10, the intermediate transfer belt 22, or the recording medium P, to form the curable 12B. After the ink droplets 14A are applied to the curable layer 12B to form an image T (in the first to third exemplary embodiments, after further transferring the curable layer 12B to the recording medium P), the curable layer 12B on which the image is formed is completely cured. At this time, the curable material contained in the curable layer 12B is cured to turn to a "cured resin". Accordingly, an image can be formed on various recording media P, regardless of whether the recording medium P is an impermeable medium or a permeable medium.

In particular, in the recording apparatuses of the first to third exemplary embodiments, employing an intermediate transfer system, the curable layer 12B on the intermediate transfer member (intermediate transfer drum 10 or the intermediate transfer belt 22), on which an image T is formed, is transferred onto the recording medium P. Therefore, for example, when the curable layer 12B has a thickness through which the ink droplets 14A do not reach the bottom of the curable layer 12B, the portion where the ink droplets 14A are present (the portion corresponding to image T) in the curable layer 12B that has been transferred to the recording medium P is not exposed, and the portion where the ink droplets 14 are absent of the curable layer 12B may serve as a protective layer after being cured, thereby enhancing image maintainability.

On the other hand, in the recording apparatus according to the fourth exemplary embodiment, since a system in which the image recording composition 12A is directly supplied onto the recording medium P (direct-recording system) is employed, the structure of the recording apparatus can be simplified, thereby enabling image formation at high speed and low cost.

Further, in each of the recording apparatuses according to the exemplary embodiments as described above, image recording composition 12A contains water-absorbing resin particles dispersed therein, and the volume average particle diameter and the content thereof are regulated to predetermined ranges. Therefore, the aqueous medium included in the aqueous ink droplets 14A is absorbed in the water-absorbing resin particles. Accordingly, diffusion, permeation, and swelling of the ink droplets 14A in the curable layer 12B, via a surface part of the particles, can be suppressed. Consequently, the ink droplets 14A are fixed within or on the surface of the curable later 12B, thereby forming an image with high fineness.

Hereinafter, the curable material will be described in detail.

The curable materials include ultraviolet-ray curable materials, electron-beam curable materials, thermosetting materials, and the like. The ultraviolet-ray curable materials are easy to be cured and have a high curing rate, as compared with other types of materials, and thus are easy to handle. The electron-beam curable materials can be cured without using a polymerization initiator, and thus make it easy to control the coloring state of the layer after curing. The thermosetting materials can be cured without using a large-scale apparatus. In the invention, the curable materials are not restricted thereto, and materials that can be cured with moisture, oxygen, or the like may also be used.

The "ultraviolet-ray curable resins" that is obtained by curing an ultraviolet-ray curable material include, for example, an acrylic resin, a methacrylic resin, a urethane resin, a polyester resin, a maleimide resin, an epoxy resin, an oxetane resin, a polyether resin, and a polyvinyl ether resin. The image recording composition 12A contains at least one kind of an ultraviolet-ray curable monomer, an ultraviolet-ray curable macromer, an ultraviolet-ray curable oligomer, and an ultraviolet-ray curable prepolymer. Among these, a fluorine-based water-repellent resin (such as a modified acrylic copolymer and an acrylic-urethane blend resin) and an oil-based silicone modified resin, specifically, a polyurethane oligomer, polyester, polyether or the like, containing a polyfunctional acrylic dimethylsiloxane polymer moiety, are preferable. A reactive monomer may further be blended for the purpose of regulating the viscosity. Moreover, an oligomer obtained by copolymerizing a silicone moiety with a urethane component in advance may also be used. In view of exposing the water-absorbing resin particles in a more favorable manner, an oil-based silicone-modified resin is preferable. In view of coating properties, wetting properties and releasing properties after curing, to conform to a resin film having high releasability for the intermediate transfer member, an oil-based silicone resin and a modified derivative thereof are preferable.

Further, the image recording composition 12A preferably contains an ultraviolet-ray polymerization initiator that promotes an ultraviolet-ray curing reaction. In order to promote the polymerization reaction, the image recording composition 12A may further contain a reaction aid, a polymerization promoter, or the like. In order to control the dispersion/settling properties of the particles, the image recording composition 12A may include a surfactant, a compatibilizer, an antisettling agent, a thermoplastic resin material, or the like.

The ultraviolet-ray curable monomers include, for example, radical curable materials such as an acrylic ester of alcohols, polyhydric alcohols and amino alcohols, a methacrylic acid ester of alcohols and polyhydric alcohols, an acrylic aliphatic amide, an acrylic alicyclic amide, and an acrylic aromatic amide; cationic curable materials such as an epoxy monomer, an oxetane monomer, and a vinylether monomer. The ultraviolet-ray curable macromers, the ultraviolet-ray curable oligomers, and the ultraviolet-ray curable prepolymers include those prepared by polymerizing these monomers at a certain polymerization degree, and radical curable materials such as an epoxy acrylate, a urethane acrylate, a polyester acrylate, a polyether acrylate, a urethane methacrylate and a polyester methacrylate formed by adding an acryloyl group or a methacryloyl group to an epoxy, urethane, polyester or polyether skeleton.

When the curing reaction progresses through a radical reaction, ultraviolet-ray polymerization initiators that can be used include, for example, benzophenone, thioxanthone-type initiators, benzyl dimethyl ketal, an α-hydroxyketone, an α-hydroxy alkylphenone, an α-aminoketone, an α-amino alkylphenone, a monoacylphosphine oxide, a bisacylphosphine oxide, hydroxybenzophenone, aminobenzophenone, titanocene-type initiators, oxime ester-type initiators, oxyphenylacetate-type initiators, and the like.

Further, when the curing reaction progresses through a cationic reaction, the ultraviolet-ray polymerization initiators that can be used include, for example, an aryl sulfonium salt, an aryl diazonium salt, a diaryl iodonium salt, a triaryl sulfonium salt, an allene-ion complex derivative, a triazine-type initiator, and the like.

The "electron-beam curable resins" obtained by curing the electron-beam curable material include, for example, an acrylic resin, a methacrylic resin, a urethane resin, a polyester resin, a polyether resin, a silicone resin, and the like. The image recording composition 12A in this case contains at least one kind of an electron-beam curable monomer, an electron-beam curable macromer, an electron-beam curable oligomer, and an electron-beam curable prepolymer.

Examples of the electron-beam curable monomer, the electron-beam curable macromer, the electron-beam curable oligomer, and the electron-beam curable prepolymer include materials similar to the aforementioned ultraviolet-ray curable materials.

The "thermosetting resins" obtained by curing the thermosetting material include an epoxy resin, a polyester resin, a phenol resin, a melamine resin, a urea resin, an alkyd resin, and the like. The image recording composition 12A in this case contains at least one kind of a thermosetting monomer, a thermosetting macromer, a thermosetting oligomer and a thermosetting prepolymer. Further, a curing agent may be added at the time of polymerization. In order to promote the thermal curing reaction, the image recording composition 12A may also contain a thermal polymerization initiator.

The thermosetting monomers include, for example, phenol, formaldehyde, bisphenol A, epichlorohydrin, cyanuric acid amide, urea, polyalcohols such as glycerin, and acids such as phthalic anhydride, maleic anhydride and adipic acid. The thermosetting macromers, thermosetting oligomers and thermosetting prepolymers include those obtained by polymerizing the aforementioned monomers to a predetermined polymerization degree, an epoxy prepolymer, a polyester prepolymer, and the like.

The thermal polymerization initiators include, for example, acids such as protic acid/Lewis acid, an alkali catalyst, a metal catalyst, and the like.

The curable material is not restricted as long as the material is cured (for example, as a result of the progress of polymerization reaction) by an external energy such as ultraviolet rays, electron beams, and heat. In view of increasing the speed of the image recording, materials with a high curing rate (for example, materials having a high polymerization reaction rate) are desirable. Examples of such curable materials include radiation curable materials (such as the above-mentioned ultraviolet-ray curable materials, electron-beam curable materials).

In view of improving the wetting property to the intermediate transfer member or the like, the curable material may be modified with silicon, fluorine, or the like. Further, in consideration of the curing rate and curing degree, the curable material preferably contains a modified prepolymer having a polyfunctional acrylic moiety.

From the viewpoint of forming an image with high fineness, the curable material desirably has a small rate of contraction due to a curing reaction. Further, in view of suppressing the contraction due to the curing reaction, it is preferable that the plasticity of the curable material is not too high. The viscosity of the curable material is desirably 5 mPa·s or more.

In view of the image-retention stability on the printed film on the intermediate transfer member, pre-curing of the image surface may be conducted in order to prevent degradation thereof, or other thermoplastic resin component or a prepolymer may be used in combination in order to increase the viscosity of the composition to a range of from several hundred mPa·s to several thousand mPa·s, or up to 30,000 mPa·s.

Next, the water-absorbing resin particles will be described in details.

The material for the water-absorbing resin particles is not restricted, as long as the material absorbs an aqueous medium.

The term "absorbs an aqueous medium" refers to a state that the amount of water absorption is 100 ml/100 g or more. The "amount of water absorption" refers to the amount of an aqueous medium absorbed by 100 g of the material (ml), and is measured in accordance with the following process.

Specifically, the water-absorbing resin particles are put in an aqueous phase until water permeates the whole sample particles, and then the sample particles are immediately taken out from the aqueous phase and left on a mesh for five minutes. Thereafter, the weight of the sample particles is measured and the amount of the water absorption is calculated. A method as stipulated in JIS K 5101-13-1 is also applicable.

The amount of water absorption of the water-absorbing resin particles with respect to an aqueous medium may be, for example, 200 ml/100 g or more.

The volume average particle diameter (volume average primary particle diameter) of the water-absorbing resin particles is from 0.5 μm or about 0.5 μm to 5.0 μm or about 5.0 μm, the number average particle diameter is preferably from 0.5 μm or about 0.5 μm to 5.0 μm or about 5.0 μm, and the ratio of the volume average particle diameter (D50v) to the number average particle diameter (D50p) (D50v/D50p) is 1.5 or less, or about 1.5 or less.

The particle diameter range of the water-absorbing resin particles is preferably from 0.5 μm to 5.0 μm, and more preferably from 0.5 μm to 3.0 μm.

The particle size distribution of the water-absorbing resin particles is preferably as suppressed as possible, in view of the adverse effects due to coarse particles such as deterioration in image, defects, degradation in surface texture and glossiness, degradation in uniformity in swelling of the particles absorbing ink on the surface portion, cracks in image, degradation in transfer efficiency, formation of aggregates occurring when a resin is dispersed, degradation in settling properties of the particles in the coating solution, nozzle clogging of a coating coater, uneven thickness due to irregularities in a gap, unstable uniformity in the layer thickness, partial curing defects in curing, and the like.

The above-described volume average particle diameter and number average particle diameter are measured in accordance with the following process, and the values described in the present specification are calculated from the same.

In the measurement, COULTER COUNTER TA-II (trade name, manufactured by Beckman Coulter) is used as a measurement apparatus and ISOTON-II (trade name, manufactured by Beckman Coulter) is used as an electrolyte.

0.5 to 50 mg of a sample is added to 2 ml of a surfactant as a dispersant, preferably a 5% aqueous solution of sodium alkylbenzene sulfonate, and the mixture is added to 100 to 150 ml of the electrolyte. The electrolyte in which the sample is suspended is subjected to a dispersion treatment for one minute using an ultrasonic disperser, and the particle size distribution of the particles having a diameter of from 2.0 μm to 60 μm is measured by the above measurement apparatus using an aperture having a diameter of 100 μm. The number of the particles measured is 50,000.

Based on the particle size distribution as measured, a cumulative distribution is drawn from the side of a smaller diameter with respect to the divided particle size ranges (channels), in volume and number, respectively. The particle diameter corresponding to a cumulative percentage of 16% in volume is defined as D16v, and the particle diameter corresponding to a cumulative percentage of 16% in number is defined as D16p. In a similar manner, the particle diameter corresponding to a cumulative percentage of 50% in volume is defined as D50v and the particle diameter corresponding to a cumulative percentage of 50% in number is D50p. Further, the particle diameter corresponding to a cumulative percentage of 84% in volume is defined as D84v and the particle diameter corresponding to a cumulative percentage of 84% in number is D84p.

On the other hand, when the particle diameter to be measured is less than 2 μm, a laser-refractive particle size distribution measurement apparatus (LA-700, trade name, manufactured by Horiba Ltd.) is used. The measurement is conducted by adjusting the solid content of the sample in the form of a dispersion to about 2 g and adding ion exchange water thereto to make about 40 ml of a sample dispersion. The sample dispersion is put in a cell to give an appropriate concentration and left to stand for about two minutes until the concentration in the cell becomes uniform, then measurement is conducted. The volume average particle diameter is determined as a volume average particle diameter at a cumulative percentage of 50%, which is obtained by accumulating the volume average particle diameters at each channel in an ascending order.

Specific examples of the material for the water-absorbing resin particles include polyacrylic acid and a salt thereof, polymethacrylic acid and a salt thereof, a copolymer of (meth)acrylic acid ester-(meth)acrylic acid or a salt thereof, a copolymer formed from an alcohol having an aliphatic group or an aromatic-substituted group and a structure of styrene-(meth)acrylic acid-carboxylic acid or a salt thereof and an ester obtained from (meth)acrylic acid, a copolymer formed from an alcohol having an aliphatic group or an aromatic-substituted group and a structure of (meth)acrylic acid ester-carboxylic acid or a salt thereof and an ester obtained from (meth)acrylic acid, a copolymer of ethylene-(meth)acrylic acid, a copolymer formed from an alcohol having an aliphatic group or an aromatic-substituted group and a structure of butadiene-(meth)acrylic acid ester-carboxylic acid or a salt thereof and an ester obtained from (meth)acrylic acid, a copolymer of polymaleic acid and a salt thereof, a copolymer of styrene-maleic acid or a salt thereof, a sulfonic-acid-modified product of the above resins, and a phosphoric-acid-modified product of the above resins.

Among these, polyacrylic acid and a salt thereof, a copolymer of styrene-(meth)acrylic acid or a salt thereof, a copolymer of styrene-(meth)acrylic acid ester-(meth)acrylic acid or a salt thereof, a copolymer formed from an alcohol having an aliphatic group or an aromatic-substituted group and a structure of styrene-(meth)acrylic acid ester-carboxylic acid or a salt thereof and an ester obtained from (meth)acrylic acid, and a copolymer of (meth)acrylic acid ester-(meth)acrylic acid or a salt thereof are preferable. These resins may be crosslinked or may not be crosslinked.

The water-absorbing resin particles may be produced by suspension-polymerization, emulsion-polymerization, solution-polymerization, or the like. The obtained water-absorbing resin particles may be used without modification or may be subjected to pulverization using a ball mill or a sand mill, frost-pulverization, or re-sedimentation using a solvent.

The content of the water-absorbing resin particles with respect to the total amount of image recording composition 12A is from 5% by weight or about 5% by weight to 50% by weight or about 50% by weight, preferably from 10% by weight to 50% by weight, and further preferably from 20% by weight to 50% by weight.

The image recording composition 12A may further contain a component other than the curable material and the water-absorbing resin particles (hereinafter, sometimes referred to as "other fixing component") in order to fix an ink component on or within the curable layer 12B.

In the present exemplary embodiment, the water-absorbing resin particles and other fixing component are mixed in the image recording composition 12A in advance. However, it is also possible to prepare a separate solution containing the water-absorbing resin particles or other fixing component, and eject the solution to the curable layer 12B from an ejector. The ejection of a solution containing water-absorbing resin particles or other fixing component onto the curable layer 12B is preferably performed prior to ejecting ink droplets 14A onto the curable layer 12B from the inkjet recording head 14.

Examples of the other fixing component include a component that adsorbs an ink component (such as a colorant) and a component that aggregates the ink component (such as a colorant) or increases the viscosity thereof, but are not limited thereto.

The components that adsorb an ink component (such as a colorant) include silica, alumina, and zeolite. The content of the component may be from 0 to 30% by weight with respect to the total amount of the image recording composition.

The components that aggregate the ink component (such as a colorant) or increase the viscosity thereof include inorganic electrolytes, organic acids, inorganic acids, and organic amines.

Examples of the inorganic electrolytes include a salt of an alkaline metal ion such as a lithium ion, a sodium ion, a potassium ion, or a polyvalent metal ion such as an aluminum ion, a barium ion, a calcium ion, a copper ion, an iron ion, a magnesium ion, a manganese ion, a nickel ion, a tin ion, a titanium ion, and a zinc ion; and an inorganic acid such as hydrochloric acid, bromic acid, hydriodic acid, sulfuric acid, nitric acid, phosphoric acid and thiocyanic acid, an organic carboxylic acid such as acetic acid, oxalic acid, lactic acid, fumaric acid, citric acid, salicylic acid and benzoic acid, and an organic sulfonic acid.

Specific examples of the above inorganic electrolytes include an alkaline metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Specific examples of the organic acids include arginine acid, citric acid, glycine, glutamic acid, succinic acid, tartaric acid, cysteine, oxalic acid, fumaric acid, phthalic acid, maleic acid, malonic acid, lycine, malic acid, and a compound represented by the following Formula (1) and derivatives thereof.

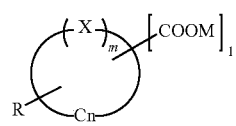

Formula (1)

In Formula (1), X represents O, CO, NH, $NR_1$, S or $SO_2$, preferably CO, NH, $NR_1$ or O, and more preferably CO, NH or O, where $R_1$ is an alkyl group, preferably $CH_3$, $C_2H_5$ or $C_2H_4OH$; R represents an alkyl group, preferably $CH_3$, $C_2H_5$ or $C_2H_4OH$, and R may be included in Formula 1 or may not be included; M represents a hydrogen atom, an alkali metal or an amine and is preferably H, Li, Na, K, monoethanol amine, diethanol amine, triethanol amine or the like, more preferably H, Na or K, and further preferably a hydrogen atom; n represents an integer of from 3 to 7 and is preferably an integer with which the heterocyclic ring is a six-membered or five-membered ring, and more preferably an integer with which the heterocyclic ring is a five-membered ring; m represents 1 or 2; and 1 represents an integer of from 1 to 5. The compound represented by Formula (1) may be a saturated ring or an unsaturated ring.

Examples of the compounds represented by Formula (1) include compounds having a structure of furan, pyrrole, pyrroline, pyrrolidone, pyrone, pyrrole, thiophene, indole, pyridine or quinoline, and further including a carboxyl group as a functional group. Specific examples of the compounds include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acids include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or derivatives or salts thereof. The organic acid is more preferably pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative or salt thereof. The organic acid is further preferably pyrrolidone carboxylic acid, pyrone carboxylic acid, furan carboxylic acid, coumaric acid, or a derivative or salt thereof.

An organic amine compound may be any of a primary amine, secondary amine, tertiary amine, quaternary amine and a salt thereof. Specific examples of the organic amine compounds include a tetraalkyl ammonium, alkylamine, benzalconium, alkylpyridium, imidazolium, polyamine and a derivative or a salt thereof, such as amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethylamino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino-butanol, amino-propanol, amino-propane diol, N-acetylamino ethanol, 2-(2-aminoethyl amino)ethanol, 2-amino-2-ethyl-1,3-propane diol, 2-(2-aminoethoxy)ethanol, 2-(3,4-dimethoxyphenyl)ethyl amine, cetyl amine, triisopropanol amine, triisopentyl amine, triethanol amine, trioctyl amine, trityl amine, bis(2-aminoethyl)1,3-propane diamine, bis(3-aminopropyl)ethylene diamine, bis(3-aminopropyl)1,3-propane diamine, bis(3-aminopropyl)methyl amine, bis(2-ethylhexyl)amine, bis(trimethylsilyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetyl pyridinium chloride, stearamid methyl pyridium chloride, a diallyl dimethyl ammonium chloride polymer, a diallyl amine polymer, and a monoallyl amine polymer.

Among these organic amine compounds, triethanol amine, triisopropanol amine, 2-amino-2-ethyl-1,3-propanediol, ethanol amine, propane diamine, and propyl amine are more preferable.

Among the above aggregating agents, polyvalent metal salts such as $Ca(NO_3)_2$, $Mg(NO_3)_2$, $Al(OH)_3$, a polyaluminum chloride, and the like, are preferably used.

The aggregating agent may be used alone or in combination of two or more kinds thereof. The content of the aggregating agent is preferably from 0.01% by weight to 30% by weight.

Further, the image recording composition 12A may contain water or an organic solvent that dissolves or disperses a main component that contributes to the curing reaction (such as a monomer, macromer, oligomer, prepolymer, or polymerization initiator). However, the total content of the main component and the water-absorbing resin particles is, for example, in the range of 30% by weight or more, preferably 60% by weight or more, and more preferably 90% by weight or more. Although image forming properties can be improved, the total content of the main component and the water-absorbing resin particles is preferably 100% by weight or less, from the viewpoint of suppressing degradation in adhesion of the image recording composition to a recording medium due to a reduced amount of a resin component, degradation in mechanical properties relating to bending or adhesion of the cured coating film, degradation in weather-resistance, shortening of operating life, degradation in repetitive transfer properties in a recording apparatus due to a residual material, or the like.

Further, the image recording composition 12A may contain a coloring material of various kinds for the purpose of controlling the color of the cured layer.

The image recording composition 12A preferably contains a thermoplastic resin for the purpose of regulating the viscosity thereof. The thermoplastic resins include acrylic resins, methacrylic-styrene resins, polyurethane, polyester, polyether, and prepolymers thereof. Among these, methacrylic resins, acryliamide resins, polyurethane, acrylic-styrene copolymers, and liquid-type acrylic monomers are particularly preferable.

From the viewpoint of favorably exposing the water-absorbing resin particles on the surface of the curable layer after ink has been ejected thereon, the viscosity of the image recording composition 12A is preferably from 5 mPa·s to 5,000 mPa·s, and more preferably from 5 mPa·s to 3,000 mPa·s. Moreover, the viscosity of the image recording composition 12A is preferably larger than the viscosity of the ink.

The above viscosity is measured by using a viscometer TV-22 (trade name, manufactured by Toki Sangyo Co., Ltd.)

at a shear rate of from 2.25 to 750 (l/s) at 15° C., and the viscosity as described in the present specification is measured in accordance with the same process.

However, it is not possible to retain image formation only with a resin layer having no compatibility with ink.

The image recording composition 12A is preferably low-volatile or non-volatile at ordinary temperature (25° C.). Here, being low-volatile refers to that the boiling point is 200° C. or more at atmospheric pressure. Further, being non-volatile refers to that the boiling point is 300° C. or more at atmospheric pressure. The same will apply to the following description.

The ink used in the invention is an aqueous ink containing an aqueous medium. UV-curable inks are also usable.

Aqueous inks include an ink containing an aqueous dye or pigment, as a recording material, dispersed or dissolved in an aqueous medium.

As the recording material, a coloring material is typically used. Although both dyes and pigments are usable, pigments are preferred. Both organic pigments and inorganic pigments can be used as the pigment, and black pigments include carbon black pigments such as furnace black, lamp black, acetylene black, channel black, and the like. Other than pigments of black and three primary colors of cyan, magenta and yellow, pigments of a specific color such as red, green, blue, brown and white, pigments having a metallic luster such as gold and silver, extender pigments having no color or a pale color, may be used. Pigments that are newly synthesized for use in the present exemplary embodiments may also be used.

Further, particles formed by adhering a dye or a pigment to the surface of a core formed from silica, alumina, or polymer beads, insoluble laked products of a dye, a colored emulsion, a colored latex, or the like, may also be used as the pigment.

Specific examples of black pigments include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080 and RAVEN 1060 (trade names; manufactured by Columbian Carbon); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names; manufactured by Cabot Corporation); COLOR BLACK FW1, COLOR BLACK FW2, COLOR BLACK FW2V, CLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names; manufactured by Degussa); and No. 25, No. 33, No. 40, No. 47, No. 52, No. 900, No. 2300, MCF-88, MA 600, MA 7, MA 8 and MA 100 (trade names; manufactured by Mitsubishi Chemical Corporation), but are not limited thereto.

Specific examples of cyan color pigments include C.I. PIGMENT BLUE−1, −2, −3, −15, −15:1, −15:2, −15:3, −15:4, −16, −22 and −60, but are not limited thereto.

Specific examples of magenta color pigments include C.I. PIGMENT RED−5, −7, −12, −48, −48:1, −57, −112, −122, −123, −146, −168, −177, −184, −202, and C.I. PIGMENT VIOLET−19, but are not limited thereto.

Specific examples of yellow color pigments include C.I. PIGMENT YELLOW−1, −2, −3, −12, −13, −14, −16, −17, −73, −74, −75, −83, −93, −95, −97, −98, −114 −128, −129, −138, −151, −154, and −180, but are not limited thereto.

When a pigment is used as the coloring material, it is desirable to use a dispersing agent in combination. The dispersing agents that can be used in the invention include a polymeric dispersant, an anionic surfactant, a cationic surfactant, an amphoteric surfactant, and a nonionic surfactant.

As the polymeric dispersant, polymers having both a hydrophilic structural moiety and a hydrophobic structural moiety are suitably used. The polymer having both a hydrophilic structural moiety and a hydrophobic structural moiety may be either a condensation-type polymer or an addition-type polymer. The condensation-type polymers include known polyester-type dispersants. The addition-type polymers include an addition polymer of a monomer having an α, β-ethylenic unsaturated group. The desired polymeric dispersant may be obtained by copolymerizing a monomer having an α, β-ethylenic unsaturated group and a hydrophilic group with a monomer having an α, β-ethylenic unsaturated group and a hydrophobic group. Moreover, a homopolymer of a monomer having a hydrophilic group and an α, β-ethylenic unsaturated group may also be used.

Monomers having an α, β-ethylenic unsaturated group and a hydrophilic group include monomers having a carboxyl group, a sulfonic acid group, a hydroxyl group, a phosphoric group, or the like. Specific examples thereof include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Monomers having an α, β-ethylenic unsaturated group and a hydrophobic group include styrene, styrene derivatives such as α-methyl styrene and vinyltoluene, vinyl cyclohexane, vinyl naphthalene, vinyl naphthalene derivatives, an alkyl acrylate, an alkyl methacrylate, phenyl methacrylate, an cycloalkyl methacrylate, an alkyl crotonate, an dialkyl itaconate, and an dialkyl maleate.

Preferable examples of copolymers used as a polymeric dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkylacrylate-acrylic acid copolymer, an alkylmethacrylate-methacrylic acid copolymer, a styrene-alkylmethacrylate-methacrylic acid copolymer, a styrene-alkylacrylate-acrylic acid copolymer, a styrene-phenyl methacrylate-methacrylic acid copolymer, and a styrene-cyclohexylmethacrylate-methacrylic acid copolymer. Moreover, monomers having a polyoxyethylene group or a hydroxyl group may be copolymerized with these polymers.

The above polymeric dispersants may have a weight average molecular weight of from 2,000 to 50,000, for example.

These pigment dispersants may be used singly or in combination of two or more kinds. The addition amount of the dispersants may greatly vary depending on the kind of the pigment, but is commonly from 0.1% by weight to 100% by weight with respect to the amount of the pigment.

A self-dispersible pigment that can dissolve in water by itself may also be used as a coloring material. The self-dispersible pigment that can dissolve in water by itself refers to a pigment having many groups that are soluble to water on the surface of the pigment, which can disperse in water without the presence of a polymeric dispersant. Specifically, the self-dispersible pigment can be obtained by subjecting a common pigment to a surface modifying treatment such as an acid/base treatment, a coupling agent treatment, a polymer graft treatment, a plasma treatment, or an oxidation/reduction treatment.

Further, the self-dispersible pigments in water include, other than the pigments that has been subjected to a surface modifying treatment as described above, CAB-O-JET-200, CAB-O-JET-300, IJX-157, IJX-253, IJX-266, IJX-273, IJX-444, IJX-55, and CABOT 260 (trade names; manufactured by Cabot Corporation), and MICROJET BLACK CW-1 and CW-2 (trade names; manufactured by Orient Chemical Industries, Ltd.).

The self-dispersible pigment preferably has at least a sulfonic acid, a sulfonic acid salt, a carboxylic acid or a carboxylic acid salt on the surface of the pigment, as a functional group. The self-dispersible pigment is more preferably a pigment having at least a carboxylic acid or a carboxylic acid salt on the surface of the pigment as a functional group.

Further, pigments covered with a resin may also be used. Such pigments are called a microcapsule pigment and include commercially available microcapsule pigments manufactured by DIC Corporation, Toyo Ink Manufacturing Co., Ltd., or the like, and microcapsule pigments experimentally prepared for the present exemplary embodiment may also be used.

Moreover, resin dispersion-type pigments prepared by physically adsorbing or chemically bonding the aforementioned polymer material to the above pigments may also be used.

The recording materials include dyes such as hydrophilic anionic dyes, direct dyes, cationic dyes, reactive dyes and polymeric dyes, and oil-soluble dyes; wax powder, resin powder or emulsions colored with a dye; fluorescent dyes and fluorescent pigments, infrared absorbing agents, and ultraviolet absorbing agents; magnetic substances, represented by ferromagnetic substances such as ferrite and magnetite; semiconductors or photocatalysts represented by titanium oxide and zinc oxide; and other organic and inorganic electronic material particles.

The content (concentration) of the recording material is, for example, in the range of from 5% by weight to 30% by weight with respect to the amount of the ink.

The volume average particle diameter of the recording material is, for example, in the range of from 10 nm to 1,000 nm.

The volume average particle diameter of the recording material refers to the particle diameter of the recording material particles themselves, or when an additive such as a dispersant is adhered to the recording material particles, refers to the particle diameter of the recording material particles including the additive attached thereto. As a measuring device of the volume average particle diameter, Microtrac UPA particle size distribution analyzer 9340 (trade name; manufactured by Leeds & Northrup) may be used. The measurement is conducted by putting 4 ml of the ink in a measurement cell, and performing measurement in accordance with a predetermined measuring method. As the data to be input for the measurement, the viscosity of the ink is used as the viscosity, and the density of the recording material is used as the density of dispersed particles.

The aqueous media include water, preferably ion exchange water, ultra-pure water, distilled water, and ultrafiltration water. An water-soluble organic solvent may also used in combination with the aqueous medium, and examples there of include polyhydric alcohols, polyhydric alcohol derivatives, nitrogen-containing solvents, alcohols, sulfur-containing solvents, and the like.

Specific examples of the water-soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin and trimethylol propane; sugar alcohols such as xylitol; and saccharides such as xylose, glucose, and galactose.

The polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerol.

The nitrogen-containing solvents include pyrrolidone, N-methyl-2-pyrrolidone, cyclohexyl pyrrolidone and triethanol amine.

The alcohols include ethanol, isopropyl alcohol, butyl alcohol and benzyl alcohol.

The sulfur-containing solvents include thiodiethanol, thiodiglycerol, sulfolane and dimethyl sulfoxide.

The water-soluble organic solvent may also be propylene carbonate, ethylene carbonate, or the like.

The water-soluble organic solvent may be used singly or in combination of two or more kinds. The content of the water-soluble organic solvent is, for example, in the range of from 1% by weight to 70% by weight.

The ink may also contain other additive(s) as necessary, such as a surfactant.

The surfactants include various kinds of anionic surfactants, nonionic surfactants, cationic surfactants and amphoteric surfactants. Among these, anionic surfactants and nonionic surfactants are preferably used.

Examples of the anionic surfactants include an alkyl benzene sulfonic acid salt, an alkyl phenyl sulfonic acid salt, an alkyl naphthalene sulfonic acid salt, a higher fatty acid salt, a sulfuric ester salt of a higher fatty acid ester, a sulfonic acid salt of a higher fatty acid ester, a sulfuric ester salt of a higher alcohol ether, a sulfonic acid salt of a higher alcohol ether, a higher alkyl sulfosuccinic acid salt, a polyoxyethylene alkyl ether carboxylate, a polyoxyethylene alkyl ether sulfate, an alkyl phosphate, and a polyoxyethylene alkyl ether phosphate. Among these, dodecyl benzene sulfonate, isopropylnaphthalene sulfonate, monobutylphenyl phenol mono-sulfonate, monobutyl biphenyl sulfonate, and dibutylphenyl phenol disulfonate.

Examples of the nonionic surfactants include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkylamine, a polyoxyethylene fatty acid amide, an alkyl alkanol amide, a polyethylene glycol polypropylene glycol block copolymer, acetylene glycol, and polyoxyethylene-added acetylene glycol. Among these, a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyethylene sorbitan fatty acid ester, a fatty acid alkylol amide, a polyethylene glycol polypropylene glycol block copolymer, acetylene glycol, and polyoxyethylene-added acetylene glycol are preferable.

In addition, silicone-based surfactants such as a polysiloxane oxyethylene adduct, fluorine-based surfactants such as a perfluoroalkyl carboxylate, a perfluoroalkyl sulfonate, and an oxyethylene perfluoroalkyl ether, and biosurfactants such as spiculisporic acid, rhamnolipid, lysolecithin, may also be used.

The surfactant may be used singly or in combination of two or more kinds. Further, in consideration of the solubility, for example, the hydrophile-lipophile balance (HLB) of the surfactant is in the range of from 3 to 20.

The addition amount of these surfactants may be, for example, in the range of from 0.001% by weight to 5% by weight, and preferably in the range of from 0.01% by weight to 3% by weight, with respect to the amount of the ink.

In addition, the ink may include a penetrant for the purpose of adjusting the permeability of the ink; polyethyleneimine, polyamines, polyvinyl pyrrolidone, polyethylene glycol, ethylcellulose, carboxymethyl cellulose, and the like, for the purpose of controlling characteristics of the ink such as ink-ejection properties; and alkali metal compounds such as potassium hydroxide, sodium hydroxide and lithium hydroxide for the purpose of adjusting the electroconductivity and the pH value of the ink. Further, a pH buffer, an antioxidant, an antifungal agent, a viscosity-controlling agent, an electric conductor, an ultraviolet absorber, a chelating agent, may also be added to the ink, if necessary.

In the following, characteristics of the ink will be explained.

The surface tension of the ink may be, for example, in the range of from 20 mN/m to 45 mN/m.

Here, the value of the surface tension refers to that obtained by using a Wilhelmy surface tensiometer (manufactured by Kyowa Interface Science Co., Ltd.) under the conditions of 23° C. and 55% RH.

The viscosity of the ink may be, for example, in the range of from 1.5 mPa·s to 30 mPa·s, preferably in the range of from 1.5 mPa·s to 20 mPa·s.

Here, the value of the viscosity refers to that obtained by using a viscometer, RHEOMAT 115 (trade name; manufactured by Contraves AG), under the conditions of a measurement temperature of 23° C. and a shear rate of $1400s^{-1}$.

The ink in the invention is not limited to the above composition. Further, for example, the ink may contain a functional material such as a liquid crystal material and an electronic material, other than the recording material.

Moreover, in each case of the above exemplary embodiments of the invention, a full color image is recorded on a recording medium by selectively ejecting ink droplets of black, yellow, magenta and cyan from respective inkjet recording heads, based on the image data. However, the exemplary embodiments of the invention are not limited to the recording of characters or images onto a recording medium, and are generally applicable to any kind of liquid-ejecting (liquid-jetting) devices for industrial use.

EXAMPLES

Hereinafter, the present invention will be explained in further details with reference to examples. However, the invention is not restricted to these examples.

Example 1

With the use of a recording apparatus having a similar configuration to the above-described second exemplary embodiment (see FIG. 3), a curable layer is formed by supplying an image recording composition onto an intermediate transfer belt from a supply unit, and ink of each color is ejected onto the curable layer from respective recording heads. Subsequently, printing is performed after transferring the curable layer onto a recording medium and curing the transferred curable layer by applying a stimulus with a stimulus application unit. The conditions for the above process are as follows.

Intermediate transfer belt: 0.1 mm in thickness; 350 mm in width; formed by coating an endless belt made of polyimide having an outer diameter of 168 mm with a fluorine-based resin (process speed: 400 mm/s)

Supply unit: gravure roll coater (thickness of the curable layer: 15 μm)

Recording head: piezo-type recording head (resolution: 600 dpi (dpi: the number of dots per inch, hereinafter the same will apply)

Transfer unit (pressure roll): formed by covering a steel pipe with a diameter of 30 mm with a fluorine-based resin (pressing force against the intermediate transfer belt: 3 kgf/cm in linear pressure)

Stimulus application unit: 160 W halogen lamp

Recording medium: art paper (OK Kinfuji (trade name), manufactured by Oji Paper Co., Ltd.)

The image recording composition and the inks of respective colors are prepared in accordance with the following processes.

| Image recording composition 1 | |
|---|---|
| Silicone-modified acrylic resin (HC1101, trade name, manufactured by Momentive Performance Materials Inc., curable material) | 70 parts by weight |
| Glycerin propoxy acrylate (manufactured by Daicel Chemical Industries, Ltd., curable material) | 30 parts by weight |

The above materials are mixed and crosslinked sulfonic-acid-modified sodium polyacrylate (AQUALIC cs7s, trade name, manufactured by Nippon Shokubai Co., Ltd., water-absorbing resin particles), pulverized by a ball mill, are further mixed thereto so that the content of the water-absorbing resin particles with respect to the total amount of the mixture is 40% by weight. Image recording composition 1, having a viscosity of 2,600 mPa·s, is thus obtained.

The volume average particle diameter (a primary particle diameter) as measured of the above water-absorbing resin particles is 0.7 μm, and the second particle diameter (a diameter of aggregation of particles) as measured for reference is 3.3 μm. The particle size distribution (D84v/D16v) as measured in accordance with the aforementioned method is 1.5.

| Black Ink 1 | |
|---|---|
| Black pigment dispersion (pigment concentration: 15% by weight) | 40 parts by weight |
| Solvent (ISOPAR L, trade name, manufacture by Exxon Mobil Corporation) | 20 parts by weight |
| Ethyl oleate | 26 parts by weight |

To the above components are added ISOPAR G (trade name, manufactured by Exxon Mobil Corporation) and oleyl alcohol in a total amount of 5 parts by weight to adjust the viscosity to 6.5 mPa·s, and black ink 1 is thus obtained.

The black pigment dispersion is prepared by adding a dispersant (SOLSPERSE 13940, manufactured by The Lubrizol Corporation) to carbon black and dispersing the mixture in a solvent (ISOPAR L, trade name, manufactured by Exxon Mobil Corporation).

| Cyan Ink 1 | |
|---|---|
| Cyan pigment dispersion (pigment concentration: 10% by weight) | 50 parts by weight |
| Solvent (ISOPAR M, trade name, manufacture by Exxon Mobil Corporation) | 20 parts by weight |
| Soybean oil | 20 parts by weight |

To the above components are added ISOPAR G (trade name, manufactured by Exxon Mobil Corporation) and oleyl alcohol in a total amount of 8 parts by weight to adjust the viscosity to 7.5 mPa·s, and cyan ink 1 is thus obtained.

The cyan pigment dispersion is prepared by adding a dispersant (SOLSPERSE 16000, manufactured by The Lubrizol Corporation) to a phthalocyanine pigment and dispersing the mixture in a solvent (ISOPAR M, trade name, manufactured by Exxon Mobil Corporation).

| Magenta Ink 1 | |
|---|---|
| Magenta pigment dispersion (pigment concentration: 15% by weight) | 30 parts by weight |
| Solvent (ISOSOL, trade name, manufacture by Nippon Oil Corporation) | 12 parts by weight |
| Soybean oil | 15 parts by weight |
| Oleyl alcohol | 30 parts by weight |

To the above components are added ISOPAR G (trade name, manufactured by Exxon Mobil Corporation) and oleyl alcohol in a total amount of 10 parts by weight to adjust the viscosity to 8.8 mPa·s, and magenta ink 1 is thus obtained.

The magenta pigment dispersion is prepared by adding a dispersant (SOLSPERSE 34750, manufactured by The Lubrizol Corporation) to a quinacridone pigment and dispersing the mixture in a solvent (ISOPAR M, trade name, manufactured by Exxon Mobil Corporation).

| Yellow Ink 1 | |
|---|---|
| Yellow pigment dispersion (pigment concentration: 18% by weight) | 25 parts by weight |
| Solvent (ISOPAR M, trade name, manufacture by Exxon Mobil Corporation) | 40 parts by weight |
| Butyl oleate | 15 parts by weight |

To the above components are added ISOPAR G (trade name, manufactured by Exxon Mobil Corporation) and oleyl alcohol in a total amount of 5 parts by weight to adjust the viscosity to 6.7 mPa·s, and yellow ink 1 is thus obtained.

The yellow pigment dispersion is prepared by adding a dispersant (DISPERBYK-101, trade name, manufactured by BYK-Chemie GmbH) to Pigment Yellow 74 and dispersing the mixture in a solvent (ISOPAR G, trade name, manufactured by Exxon Mobil Corporation).

A curable layer having a thickness of 12 μm is formed by applying the above-prepared image recording composition 1 onto the aforementioned intermediate transfer belt by an Eriksen applicator with a gap of 7 μm. Printing is performed by ejecting the above-prepared inks of four colors onto the curable layer using the above recording head (with a resolution of 600 dpi), respectively. Thereafter, the above art paper sheet is closely contacted to the intermediate transfer belt to transfer the curable layer to the art paper sheet using the pressure roller with a load of 1 kgf, and the curable layer is cured by irradiating with UV rays using the 160 W halogen lamp for five seconds, thereby forming an image.

Example 2

An image is formed in a similar manner to Example 1, except that the glycerin propoxy acrylate used in image recording composition 1 is changed to the same amount of diacrylate (PEG 400, trade name, manufactured by Daicel Chemical Industries, Ltd.), the gap of the Eriksen applicator is changed to 12 μm, and the thickness of the curable layer is changed to 23 μm.

Example 3

An image is formed in a similar manner to Example 1, except that the silicone-modified acrylic resin used in image recording composition 1 is changed to the same amount of polyether-modified triacrylate-dimethylsiloxane (TEGO-NET 2200, trade name, manufactured by Degussa) and the crosslinked sulfonic-acid-modified sodium polyacrylate is changed to a crosslinked acrylamide-modified sodium polyacrylate in an amount of 35% by weight, and the thickness of the curable layer is changed to 18 μm.

The volume average particle diameter (a primary particle diameter) as measured of the above water-absorbing resin particles (crosslinked acrylamide-modified sodium polyacrylate), second particle diameter (a diameter of aggregation of particles), and the particle size distribution (D84v/D 16v) as measured are shown in Table 1.

Example 4

An image is formed in a similar manner to Example 1, except that the glycerin propoxy acrylate is changed to the same amount of urethane-modified acrylic resin (M313, trade name, manufactured by Daicel Chemical Industries, Ltd.) and the crosslinked sulfonic-acid-modified sodium polyacrylate is changed to a crosslinked acrylamide-modified sodium polyacrylate in an amount of 30% by weight, and the thickness of the curable layer is changed to 24 μm.

The volume average particle diameter (a primary particle diameter) as measured of the above water-absorbing resin particles (crosslinked acrylamide-modified sodium polyacrylate), second particle diameter (a diameter of aggregation of particles), and the particle size distribution (D84v/D 16v) as measured are shown in Table 1.

Example 5

An image is formed in a similar manner to Example 1, except that the crosslinked sulfonic-acid-modified sodium polyacrylate is changed to a crosslinked ammonium-salt-acryl-modified sodium polyacrylate (manufactured by Sankyo Chemicals) in an amount of 12% by weight, and the thickness of the curable layer is changed to 15 μm.

The volume average particle diameter (a primary particle diameter) as measured of the above water-absorbing resin particles (crosslinked ammonium-salt-acryl-modified sodium polyacrylate), second particle diameter (a diameter of aggregation of particles), and the particle size distribution (D84v/D 16v) as measured are shown in Table 1.

Example 6

An image is formed in a similar manner to Example 3, except that the crosslinked acrylamide-modified sodium polyacrylate is changed to sodium polyacrylate (manufactured by Sankyo Chemicals) in an amount of 45% by weight, and the thickness of the curable layer is changed to 22 μm.

The volume average particle diameter (a primary particle diameter) as measured of the above water-absorbing resin particles (sodium polyacrylate), second particle diameter (a diameter of aggregation of particles), and the particle size distribution (D84v/D16v) as measured are shown in Table 1.

Comparative Example 1

An image is formed in a similar manner to Example 1, except that the water-absorbing resin particles (crosslinked sulfonic-acid-modified sodium polyacrylate) used in image recording composition 1 is changed to those classified into smaller particle diameters.

The volume average particle diameter (a primary particle diameter) as measured of the above water-absorbing resin particles (crosslinked sulfonic-acid-modified sodium polyacrylate), second particle diameter (a diameter of aggregation of particles), and the particle size distribution (D84v/D16v) of the water-absorbing resin particles after classification are shown in Table 1.

Comparative Example 2

An image is formed in a similar manner to Example 1, except that the water-absorbing resin particles (crosslinked sulfonic-acid-modified sodium polyacrylate) used in image recording composition 1 is changed to those of crosslinked acrylamide-modified sodium polyacrylate that have been taken out in the form of coarse powder and then classified.

The volume average particle diameter (a primary particle diameter) as measured of the above water-absorbing resin particles (crosslinked acrylamide-modified sodium polyacrylate), second particle diameter (a diameter of aggregation of particles), and the particle size distribution (D84v/D16v) of the water-absorbing resin particles after classification are shown in Table 1.

Comparative Example 3

An image is formed in a similar manner to Example 5, except that the content of the water-absorbing resin particles (crosslinked ammonium-salt-acryl-modified sodium polyacrylate) used in the image recording composition is changed to 3% by weight with respect to the total amount of the image recording composition.

The volume average particle diameter (a primary particle diameter) as measured of the above water-absorbing resin particles (crosslinked ammonium-salt-acryl-modified sodium polyacrylate), second particle diameter (a diameter of aggregation of particles), and the particle size distribution (D84v/D16v) as measured are shown in Table 1.

Comparative Example 4

An image is formed in a similar manner to Example 6, except that the content of the water-absorbing resin particles (sodium polyacrylate) used in the image recording composition is changed to 50% by weight of the total amount of the image recording composition.

The volume average particle diameter (a primary particle diameter) as measured of the above water-absorbing resin particles (sodium polyacrylate), second particle diameter (a diameter of aggregation of particles), and the particle size distribution (D84v/D16v) as measured are shown in Table 1.

TABLE 1

| | | Water-absorbing resin particles | | | | Curable layer | |
|---|---|---|---|---|---|---|---|
| | Resin | Volume average particle diameter D50v (μm) | Secondary particle diameter (μm) | Particle size distribution | Content (% by weight) | Viscosity (mPa·s) | Thickness after curing (μm) |
| Example 1 | Crosslinked sulfonic acid-modified sodium polyacrylate | 0.7 | 3.3 | 1.5 | 40 | 2600 | 12 |
| Example 2 | Crosslinked sulfonic acid-modified sodium polyacrylate | 0.7 | 3.3 | 1.4 | 40 | 3300 | 23 |
| Example 3 | Crosslinked acrylamide-modified sodium polyacrylate | 1.5 | 2.9 | 1.2 | 35 | 1800 | 18 |
| Example 4 | Crosslinked acrylamide-modified sodium polyacrylate | 4.3 | 4.9 | 1.2 | 30 | 1200 | 24 |
| Example 5 | Crosslinked ammonium-salt-acryl-modified sodium polyacrylate | 3.5 | 4.2 | 1.4 | 12 | 800 | 15 |
| Example 6 | Sodium polyacrylate | 2.8 | 3.6 | 1.3 | 45 | 4500 | 22 |
| Comp. Example 1 | Crosslinked sulfonic acid-modified sodium polyacrylate | 0.3 | 2.1 | 1.1 | 40 | 33000 | 11 |
| Comp. Example 2 | Crosslinked acrylamide-modified sodium polyacrylate | 6 | 15 | 2.5 | 40 | 5600 | 19 |
| Comp. Example 3 | Crosslinked ammonium-salt-acryl-modified sodium polyacrylate | 0.7 | 2.2 | 1.2 | 3 | 450 | 5 |
| Comp. Example 4 | Sodium polyacrylate | 33 | 3.6 | 1.3 | 50 | 55000 | 55 |

Evaluation (Measurement of Surface Glossiness G75°)

The surface glossiness of the image (after being cured) is measured by a digital high-precision glossmeter (manufactured by Murakami Color Research Laboratory Co., Ltd.) at an incident angle of 75°. The results are shown in Table 2.

(Measurement of Surface Roughness Rz and Maximum Roughness Rmax)

The surface roughness Rz and the maximum roughness Rmax of the image (after being cured) are measured in accordance with the aforementioned method. The results are shown in Table 2.

(Measurement of Contact Angle)

The contact angle of water on the surface of the coating film is measured by a contact angle meter, CA-X (trade name, manufactured by Kyowa Interface Science Co., Ltd.). The results are shown in Table 2.

(Measurement of Transfer Efficiency)

The transfer efficiency (%) of the curable layer (after being cured) to a recording medium is measured in accordance with the following process. After UV-curing the layer formed from the image recording composition on the intermediate transfer belt, the cured layer is transferred to an A4 sheet of paper having a thickness of 100 μm. The weight of the sheet is measured in advance. Thereafter, the transfer efficiency is calculated from the amount of change in weight of the sheet caused by the transferring. The results are shown in Table 2.

(Evaluation of Unevenness in Printing)

The occurrence of unevenness in printing in the formed image is visually observed in accordance with the following criteria. The results are shown in Table 2.

A: High degree of glossiness is achieved and defects such as uneven printing, image blurring, uneven transfer are not observed.

B: Uneven printing or image blurring is slightly observed, but no unevenness in transfer is observed.

C: Defects such as uneven printing, image blurring, bleeding are distinctly observed in the coating film, and unevenness in transfer is highly visible.

TABLE 2

| | Evaluation | | | | | |
|---|---|---|---|---|---|---|
| | Surface Glossiness G75° (gloss) | Surface Roughness Rz (μm) | Maximum Roughness Rmax (μm) | Contact Angle (°) | Transfer Efficiency (%) | Unevenness in Printing |
| Example 1 | 23 | 7 | 18 | 35 | 95 | A |
| Example 2 | 15 | 9 | 13 | 80 | 93 | A |
| Example 3 | 33 | 5 | 11 | 44 | 88 | A |
| Example 4 | 52 | 4 | 8 | 31 | 94 | A |
| Example 5 | 44 | 12 | 20 | 54 | 91 | A |
| Example 6 | 32 | 6 | 15 | 34 | 93 | A |
| Comp. Example 1 | 88 | 2 | 12 | 22 | 76 | B |
| Comp. Example 2 | 24 | 12 | 22 | 34 | 43 | B |
| Comp. Example 3 | 90 | 2 | 4 | 88 | 98 | C |
| Comp. Example 4 | 12 | 15 | 35 | 12 | 33 | C |

All publications, patent applications, and technical standards mentioned in this specification are herein incorporated by reference to the same extent as if each individual publication, patent application, or technical standard was specifically and individually indicated to be incorporated by reference.

What is claimed is:

1. A recording apparatus comprising:
an intermediate transfer member;
a supply unit;
an image recording composition stored in the supply unit, the image recording composition having water-absorbing resin particles and a curable material that is cured upon application of an external stimulus, a volume average particle diameter of the water-absorbing resin particles being from about 0.5 μm to about 5.0 μm, and a content of the water-absorbing resin particles in the image recording composition being from about 5% by weight to about 50% by weight;
the supply unit supplying the image recording composition to the intermediate transfer member;
an ejection unit that ejects an aqueous ink containing an aqueous solvent onto a curable layer formed from the image recording composition that has been supplied to the intermediate transfer member;
a transfer unit that transfers the curable layer onto which the aqueous ink has been ejected to a recording medium; and
a stimulus application unit that applies a stimulus that cures the curable layer to the recording medium, the curable layer having been transferred onto the recording medium after the aqueous ink has been ejected onto the curable layer.

2. The recording apparatus according to claim 1, wherein the water-absorbing resin particles contains a crosslinked water-absorbing resin.

3. The recording apparatus according to claim 1, wherein a number average particle diameter of the water-absorbing resin particles contained in the image recording composition is from about 0.5 μm to about 5.0 μm, and a value of the volume average particle diameter of the water-absorbing resin particle/the number average particle diameter of the water-absorbing resin particles is about 1.5 or less.

4. The recording apparatus according to claim 1, wherein the content of the water-absorbing resin particles in the image recording composition is from about 20% by weight to about 50% by weight.

5. The recording apparatus according to claim 1, wherein the curable material is at least one selected from the group consisting of an ultraviolet-ray-curable material that is cured upon irradiation with ultraviolet rays, an electron-beam-curable material that is cured upon irradiation with electron beams, and a heat-curable material that is cured by heating.

6. The recording apparatus according to claim 1, wherein the image recording composition further comprises a thermoplastic resin.

7. A recording apparatus comprising:
a supply unit;
an image recording composition stored in the supply unit, the image recording composition having water-absorbing resin particles and a curable material that is cured upon application of an external stimulus, a volume average particle diameter of the water-absorbing resin particles being from about 0.5 μm to about 5.0 μm, and a content of the water-absorbing resin particles in the image recording composition being from about 5% by weight to about 50% by weight;

the supply unit supplying the image recording composition to a recording medium;

an ejection unit that ejects an aqueous ink containing an aqueous solvent onto a curable layer formed from the image recording composition that has been supplied to the recording medium; and a stimulus application unit that applies a stimulus that cures the curable layer to the recording medium, the curable layer being cured on the recording medium after the aqueous ink has been ejected onto the curable layer.

8. The recording apparatus according to claim 7, wherein the water-absorbing resin particles contains a crosslinked water-absorbing resin.

9. The recording apparatus according to claim 7, wherein a number average particle diameter of the water-absorbing resin particles is from about 0.5 μm to about 5.0 μm, and a value of the volume average particle diameter of the water-absorbing resin particles/the number average particle diameter of the water-absorbing resin particles is about 1.5 or less.

10. The recording apparatus according to claim 7, wherein the content of the water-absorbing resin particles in the image recording composition is from about 20% by weight to about 50% by weight.

11. The recording apparatus according to claim 7, wherein the curable material is at least one selected from the group consisting of an ultraviolet-ray-curable material that is cured upon irradiation with ultraviolet rays, an electron-beam-curable material that is cured upon irradiation with electron beams, and a heat-curable material that is cured by heating.

12. The recording apparatus according to claim 7, wherein the image recording composition further comprises a thermoplastic resin.

* * * * *